(12) United States Patent
Glad et al.

(10) Patent No.: US 11,811,032 B2
(45) Date of Patent: Nov. 7, 2023

(54) BATTERY SWELL DETECTION

(71) Applicant: Cirque Corporation, Sandy, UT (US)

(72) Inventors: Paul Glad, Sandy, UT (US); Jared Bytheway, Sandy, UT (US); Brian Monson, Farmington, UT (US)

(73) Assignee: Cirque Corporation, Sandy, UT (US)

( * ) Notice: Subject to any disclaimer, the term of this patent is extended or adjusted under 35 U.S.C. 154(b) by 287 days.

(21) Appl. No.: 17/064,850

(22) Filed: Oct. 7, 2020

(65) Prior Publication Data

US 2022/0109197 A1 Apr. 7, 2022

(51) Int. Cl.
| | | |
|---|---|---|
| *H01M 10/48* | (2006.01) | |
| *G06F 3/044* | (2006.01) | |
| *H01M 10/058* | (2010.01) | |
| *G06F 1/16* | (2006.01) | |

(52) U.S. Cl.
CPC ........ *H01M 10/488* (2013.01); *G06F 3/0445* (2019.05); *H01M 10/058* (2013.01); *G06F 1/1635* (2013.01)

(58) Field of Classification Search
CPC ........ G06F 1/1635; G06F 1/203; G06F 1/206; G06F 3/0416; G06F 3/0445; G06F 3/0446; H01M 10/058; H01M 10/48; H01M 10/488; H01M 2220/20; H01M 2220/30
See application file for complete search history.

(56) References Cited

U.S. PATENT DOCUMENTS

| | | | |
|---|---|---|---|
| 3,656,340 A | 4/1972 | Ball | |
| 7,826,189 B1 * | 11/2010 | Edwards | H01M 50/569 |
| | | | 320/135 |
| 8,691,408 B2 | 4/2014 | Hong | |
| 8,717,186 B2 | 5/2014 | Zhou | |
| 9,442,594 B2 | 9/2016 | Graham | |
| 9,608,297 B2 | 3/2017 | Van Lammeren | |
| 9,673,644 B2 | 6/2017 | Park | |
| 10,122,050 B2 | 11/2018 | Fukuda | |
| 10,158,149 B2 | 12/2018 | Albert | |
| 10,312,555 B2 | 6/2019 | Fukuda | |
| 10,522,814 B2 | 12/2019 | Lee | |
| 2005/0001627 A1 * | 1/2005 | Anbuky | G01R 31/392 |
| | | | 700/297 |
| 2009/0274958 A1 | 11/2009 | Fukumine | |
| 2010/0247980 A1 | 9/2010 | Jang | |
| 2012/0208054 A1 | 8/2012 | Shirasawa | |
| 2013/0093383 A1 | 4/2013 | Kim | |
| 2014/0002269 A1 | 1/2014 | Zhou | |
| 2014/0042961 A1 | 2/2014 | Lan | |
| 2014/0062418 A1 | 3/2014 | Lim | |
| 2015/0137767 A1 | 5/2015 | Kim | |
| 2015/0180016 A1 | 6/2015 | Choi | |
| 2015/0311571 A1 | 10/2015 | Krauss | |
| 2015/0380777 A1 | 12/2015 | Kim | |
| 2016/0064780 A1 | 3/2016 | Jarvis | |

(Continued)

*Primary Examiner* — Huy Q Phan
*Assistant Examiner* — Adam S Clarke

(57) ABSTRACT

A system for detecting a change in a battery cell may include instructions executable by a processor to determine a baseline profile of a battery cell with a capacitance sensor, detect a changed profile from the baseline profile with the capacitance sensor, match the changed profile with a stored profile where the stored profile is associated with a condition, and classify the battery cell as having the condition associated with the stored profile.

14 Claims, 18 Drawing Sheets

(56) References Cited

U.S. PATENT DOCUMENTS

| | | |
|---|---|---|
| 2016/0116548 A1 | 4/2016 | Ghantous |
| 2016/0149270 A1* | 5/2016 | Albert ................. H01M 10/488 429/50 |
| 2016/0268644 A1 | 9/2016 | Lee |
| 2017/0077717 A1 | 3/2017 | Undgren |
| 2017/0331157 A1 | 11/2017 | Newman |
| 2018/0149462 A1 | 5/2018 | Ghantous |
| 2018/0261824 A1 | 9/2018 | Ju |
| 2019/0198938 A1* | 6/2019 | Fujita ................... H02J 7/0029 |
| 2022/0093980 A1* | 3/2022 | Reddy ................ H01M 10/425 |

* cited by examiner

BATTERY SWELL DETECTION

FIELD OF THE DISCLOSURE

This disclosure relates generally to systems and methods for detecting changes in a size or shape of a battery cell. In particular, this disclosure relates to systems and methods for sensing dimensional changes in a battery cell within a battery assembly.

BACKGROUND

A change in a battery size, shape, or other dimension may indicate that a part of the battery cell is nearing failure or may indicate the presence of a dangerous situation. Lithium-ion (Li-ion) batteries are often used in numerous consumer, military, and aerospace electronic goods such as laptops, cellular phones, satellites, spacecraft, and the like. Li-ion batteries can present safety hazards because they contain a flammable electrolyte (typically a Li salt) and may need to be kept pressurized. Li-ion batteries can swell as they age and degrade.

A swollen battery cell is a potentially dangerous problem in devices that have a restricted space constraint. Traditionally, laptops, for example, enclosed batteries in rigid plastic or metal cases that confined any swelling and prevented it from pushing into other parts of the laptop. Typical battery assemblies may include a few individual battery cells. Presently, as laptops have become thinner and lighter, individual battery cells are often encapsulated in a vacuum sealed plastic pouch or bag, and if the battery cell swells the battery pack pushes on components around it. This typically means it pushes on the keyboard and/or the touch pad. Forces from a swollen battery can be quite large and can cause mechanical damage. Other drawbacks, disadvantages, and inconveniences of present systems and methods also exist.

An example of a battery detection system is disclosed in U.S. Patent Publication No. 2014/0042961 issued to Chi-Ming Lan. This reference discloses an electronic device and a method for detecting the swelling of a battery. The electronic device includes a battery module, a swelling detection module, and a system. The battery module includes at least one battery therein. The deformation module is deposed within the battery module and is configured to detect the swelling of the battery thereby generating a signal. The system is configured to receive the signal directly transmitted from the deformation module, and to determine whether the signal is greater than a first setting value or less than a second setting value, such that when the signal is greater than the first setting value or less than the second setting value, the system activates a protection mechanism to prevent the battery from further swelling.

Another example of a battery detection system is disclosed in U.S. Pat. No. 8,691,408 issued to Eui-Sun Hong, et al. This reference discloses a secondary battery that includes a case having positive and negative electrodes, a safety device attached to a surface of the case and having a resistance value which changes during swelling of the case, and a protective circuit module attached to a side of the case while being electrically connected to the safety device. The resistance value of the safety device changes as the case swells, and the protective circuit module reduces or interrupts charging/discharging currents in response thereto. The safety device can be used for all secondary batteries regardless of capacity, can quickly react against abruptly rising internal temperature and rapid swelling, and can stably prevent swelling which occurs above an allowable temperature. Both of these references are herein incorporated by reference for all that they teach.

SUMMARY

In some embodiments, a portable electronic device may include a battery assembly. The battery assembly may include at least one battery cell, swell detection circuitry configured to detect swelling of the at least one battery cell, and the swell detection circuitry may further have a first substrate with a first set of electrodes spaced apart and electrically separated from a second set of electrodes.

The portable electronic device may include a touch input component and the swell detection circuitry is electrically connected to touch logic circuitry of the touch input component and the touch logic circuitry is configured to measure capacitance between an intersection of one of the first set of electrodes and one of the second set of electrodes.

The first set of electrodes may be a set of transmit electrodes and the second set of electrodes may be a set of sense electrodes.

The first set of electrodes may be oriented transverse to the second set of electrodes.

The touch input component may include a second substrate with a third set of electrodes spaced apart and electrically separated from a fourth set of electrodes, a touch surface with a first side adjacent to the second substrate and a second side exposed in the portable electronic device, and the touch logic circuitry that is configured to measure the capacitance between at least one intersection when one of the third set of electrodes overlaps with one of the fourth set of electrodes.

The touch surface may be at least partially transparent to electric fields such that proximity of an electrically conductive object to the first side of the touch surface may cause a change in the capacitance at the at least one intersection between the third set of electrodes and the fourth set of electrodes.

The portable electronic device may further include a layer of electrically conductive material. The second substrate may be located between the touch surface and the layer of electrically conductive material, and the electrically conductive layer is positioned to shield the second substrate from electric interference.

The second substrate may be positioned between the touch surface and a display layer.

The touch input component may be a touch pad.

The touch input component may be a touch screen.

The touch logic circuitry may be configured to send the interpretations from the first substrate and from the second substrate to an embedded controller on a system board of the portable electronic device.

The swell detection circuitry may be located between the at least one battery cell and an electrically conductive layer, and the electrically conductive layer is configured to shield the swell detection circuitry from electric interference.

In some embodiments, a portable electronic device may include a battery assembly. The battery assembly may include at least one battery cell, swell detection circuitry configured to detect swelling of the at least one battery cell, the swell detection circuitry further comprising a first substrate with a first set of electrodes spaced apart and electrically separated from a second set of electrodes. The portable electronic device may also include a touch input component. The touch input component may include a second substrate with a third set of electrodes spaced apart and electrically separated from a fourth set of electrodes, and a touch surface with a first side adjacent to the first substrate and a second side exposed in the portable electronic device. The swell detection circuitry is electrically connected to the touch logic circuitry of the touch input component and the touch logic circuitry is configured to measure capacitance between on intersection of the one of the first set of electrodes and one of the second set of electrodes. The touch logic circuitry is also configured to measure the capacitance between at least one intersection where one of the third set of electrodes overlaps with one of the fourth set of electrodes of the touch input component.

The touch surface may be at least partially transparent to electric fields such that proximity of an electrically conductive object to the first side of the touch surface may cause a change in the capacitance at the at least one intersection of the second substrate.

The first set of electrodes may be a set of transmit electrodes and the second set of electrodes is a set of sense electrodes.

The first set of electrodes may be oriented transverse to the second set of electrodes.

The touch logic circuitry may be configured to send the interpretations from the first substrate and from the second substrate to an embedded controller on a system board of the portable electronic device.

The swell detection circuitry may be located between the at least one battery cell and an electrically conductive layer where the electrically conductive layer is configured to shield the swell detection circuitry from electric interference.

In some embodiments, a computer-program product for detecting battery swell where the computer-program product may include a non-transitory computer-readable medium storing instructions executable by a processor to apply a voltage on at least one transmit electrode located on a substrate in swell detection circuitry where the substrate is adjacent to a battery cell, measure a capacitance from at least one sense electrode located on the substrate where the at least one sense electrode is spaced apart and electrically isolated from the transmit electrode and where the capacitance is from an intersection of the at least one sense electrode and the at least one transmit electrode, and determine that the measured capacitance is a change from a baseline capacitance at the intersection.

The instructions may be executable by a processor to determine that the battery cell has expanded based at least in part on the change of the measured capacitance from the baseline capacitance.

In one embodiment, a battery assembly may include at least one battery cell, power management circuitry in communication with the at least one battery cell, swell detection circuitry configured to detect swelling of the at least one battery cell, a first connector configured to electrically connect the power management circuitry to an input/output of a system board of a portable electrical device, and a second connector configured to electrically connect the swell detection circuitry to touch logic circuitry of a touch input component of the portable electrical device.

The touch input component may be a touch pad assembly.

The touch input component may be a touch screen assembly.

The battery assembly may include a rigid casing at least partially encompassing the at least one battery cell.

The swell detection circuitry may be attached to an exterior of the casing.

The swell detection circuitry may be embedded into a thickness of the casing.

The swell detection circuitry may be located within the casing and proximate to the at least one battery cell.

The swell detection circuitry may be located within an opening defined in the casing.

The swell detection circuitry may be located on an exterior of the casing and adjacent to an opening defined in the casing where the swell detection circuitry is configured to sense a condition of the battery cell through the opening.

The rigid casing may fully encompass the at least one battery cell.

The swell detection circuitry may include a substrate with at least one transmit electrode spaced apart and electrically separated from at least one sense electrode.

In one embodiment, a portable electronic device may include touch input component, a system board in communication with the touch input component, a battery assembly in communication with the system board, at least one battery cell of the battery assembly, power management circuitry in communication with the at least one battery cell, swell detection circuitry configured to detect swelling of the at least one battery cell, a first connector configured to electrically connect the power management circuitry to an input/output of a system board of a portable electrical device, and a second connector configured to electrically connect the swell detection circuitry to touch logic circuitry of the touch input component.

The rigid casing further may include a rigid barrier that is positioned between the battery cell and the touch input component and an open underside.

The swell detection circuitry may be positioned adjacent to the underside of the at least battery cell.

The portable electronic device may include a covering that encompasses the battery assembly and the system board where the swell detection circuitry is connected to the covering.

The swell detection circuitry may include substrate with at least one transmit electrode spaced apart and electrically separated from at least one sense electrode where the touch logic circuitry may be configured to detect a capacitance measurement between the transmit electrode and the sense electrode, and where the touch logic circuitry may be configured to detect battery swelling based at least in part on a change in capacitance between the transmit electrode and the sense electrode.

The touch logic circuitry may be configured to determine when an expanded portion of the battery cell has a uniform internal pressure.

The touch logic circuitry may be configured to determine when an expanded portion of the battery cell has an uneven pressure.

In one embodiment, a system of detecting a change in a battery cell includes a battery assembly where the battery assembly includes at least one battery cell. The system also includes a swell detection circuitry adjacent to the battery cell where the swell detection circuitry includes a substrate with a first set of electrodes spaced apart and electrically separated from a second set of electrodes. The system also includes a processor and memory in communication with the processor and storing programmed instruction that, when executed, cause the processor to determine a baseline profile of a battery cell with a capacitance sensor, detect a changed profile from the baseline profile with the capacitance sensor, match the changed profile with a stored profile where the stored profile is associated with a condition, and classify the battery cell as having the condition associated with the stored profile.

The system may include a touch input component having touch logic circuitry where the processor is incorporated into the touch input component and the touch logic circuitry is configured to measure capacitance between an intersection of one of the first set of electrodes and one of the second set of electrodes.

The first set of electrodes may be a set of transmit electrodes and the second set of electrodes is a set of sense electrodes.

The first set of electrodes may be oriented transverse to the second set of electrodes.

The battery assembly may be incorporated into a portable electronic device and the stored profiles are stored in the portable electronic device.

The condition may be battery swelling due to outgassing.

The programmed instructions may be further configured to cause the processor, when executed, to send a notification about the condition when the condition is classified as a potentially dangerous condition.

The condition may be a movement shift between the battery cell and a rigid casing at least partially encompassing the battery cell.

The stored profile may be characterized by a symmetric shape is associated with a condition of battery cell swelling due to outgassing.

The baseline profile may include a side of the battery cell.

The baseline profile may include a portion of the battery cell accessible through an opening formed in a rigid casing encompassing at least a portion of the battery cell.

The substrate may be positioned adjacent to an opening defined in the rigid casing.

The substrate may be positioned within an opening defined in the rigid casing.

The substrate may be located within an internal chamber defined by the rigid casing.

In some embodiments, a computer-program product may be for detecting a change in a battery cell where the computer-program product includes a non-transitory computer-readable medium storing instructions executable by a processor to determine a baseline profile of a battery cell with a capacitance sensor, detect a changed profile from the baseline profile with the capacitance sensor, match the changed profile with a stored profile where the stored profile is associated with a condition, and classify the battery cell as having the condition associated with the stored profile.

The condition may be swelling due to internal outgassing.

The instructions may be executable by the processor to sending a notification about the condition when the condition is classified as a potentially dangerous condition.

The stored profile may be characterized by a symmetric shape is associated with a condition of battery cell swelling due to outgassing.

The baseline profile may include a side of the battery cell.

The baseline profile may include a portion of the battery cell accessible through an opening formed in a rigid casing encompassing at least a portion of the battery cell.

Figure 1:
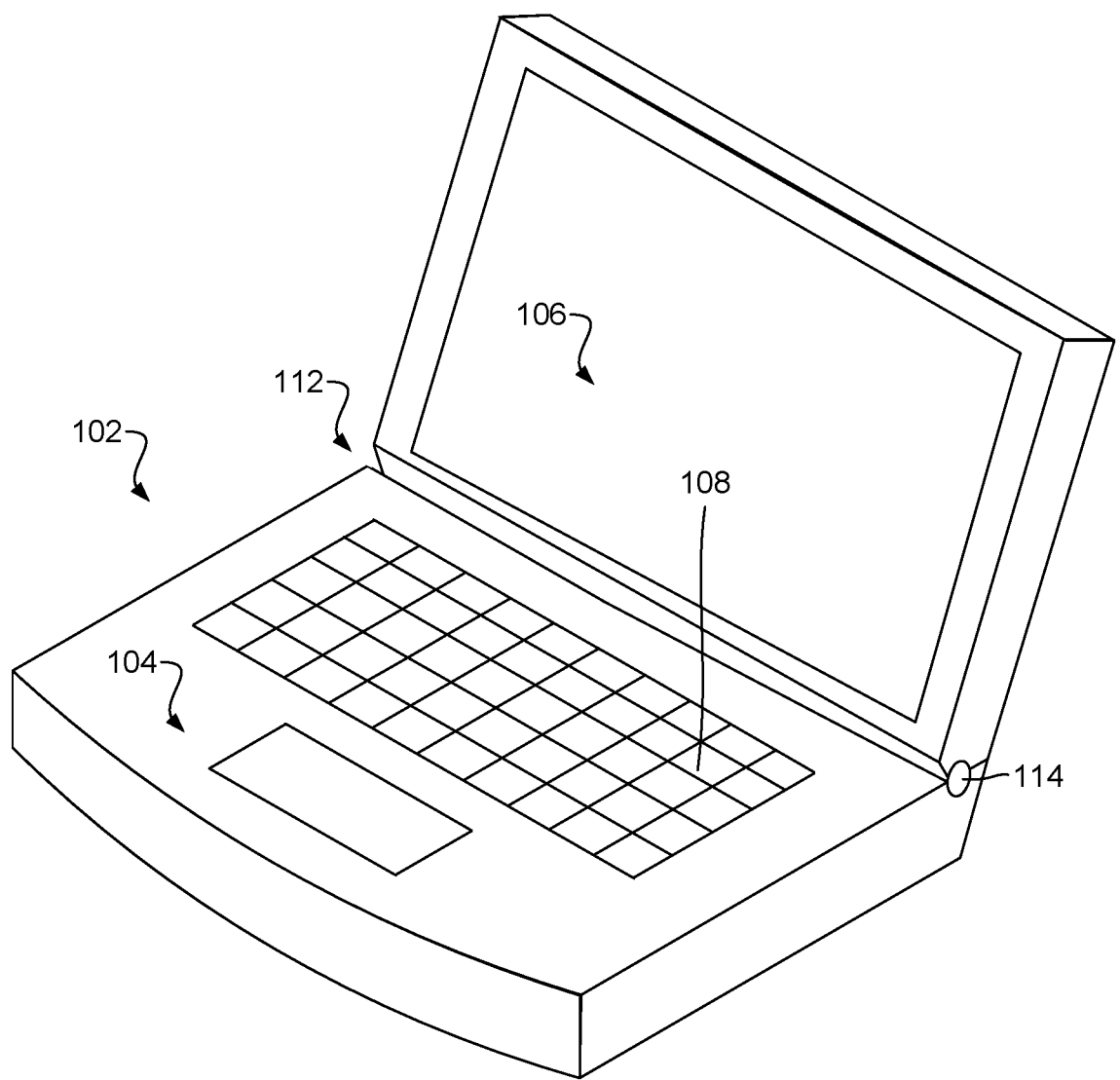
FIG. 1 depicts an example of a portable electronic device in accordance with the disclosure.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

DETAILED DESCRIPTION OF THE INVENTION

This description provides examples, and is not intended to limit the scope, applicability or configuration of the invention. Rather, the ensuing description will provide those skilled in the art with an enabling description for implementing embodiments of the invention. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted, or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

For purposes of this disclosure, the term "aligned" generally refers to being parallel, substantially parallel, or forming an angle of less than 35.0 degrees. For purposes of this disclosure, the term "transverse" generally refers to perpendicular, substantially perpendicular, or forming an angle between 55.0 and 125.0 degrees. For purposes of this disclosure, the term "length" generally refers to the longest dimension of an object. For purposes of this disclosure, the term "width" generally refers to the dimension of an object from side to side and may refer to measuring across an object perpendicular to the object's length.

For purposes of this disclosure, the term "electrode" may generally refer to a portion of an electrical conductor intended to be used to make a measurement, and the terms "route" and "trace" generally refer to portions of an electrical conductor that are not intended to make a measurement. For purposes of this disclosure in reference to circuits, the term "line" generally refers to the combination of an electrode and a "route" or "trace" portions of the electrical conductor. For purposes of this disclosure, the term "Tx" generally refers to a transmit line, electrode, or portions thereof, and the term "Rx" generally refers to a sense line, electrode, or portions thereof.

For the purposes of this disclosure, the term "portable electronic device" may generally refer to devices that can be transported and include a battery and electronic components. Examples may include an electric vehicle, a hybrid vehicle, a laptop, a desktop, a mobile phone, an electronic tablet, a personal digital device, a watch, a gaming controller, a wearable device, another type of device, or combinations thereof. As an example, a material that is in direct physical contact with an object may touch the object. On the other hand, a material that is in indirect physical contact with the object may include being in direct physical contact with an intervening material (or intervening materials) that is in direct physical contact with the object.

It should be understood that use of the terms "touch pad" and "touch sensor" throughout this document may be used interchangeably with "capacitive touch sensor," "capacitive sensor," "capacitive touch and proximity sensor," "proximity sensor," "touch and proximity sensor," "touch panel," "trackpad", "touch pad," and "touch screen."

It should also be understood that, as used herein, the terms "vertical," "horizontal," "lateral," "upper," "lower," "left," "right," "inner," "outer," etc., can refer to relative directions or positions of features in the disclosed devices and/or assemblies shown in the Figures. For example, "upper" or "uppermost" can refer to a feature positioned closer to the top of a page than another feature. These terms, however, should be construed broadly to include devices and/or assemblies having other orientations, such as inverted or inclined orientations where top/bottom, over/under, above/below, up/down, and left/right can be interchanged depending on the orientation.

While many of the examples below are depicted with reference to a battery size detection system, the system may be applied to detect size changes in any type of objects. For example, the size detection system may be used to detect the size changes of solids, gases, liquids, combinations thereof, or complex devices, such as battery assemblies. A non-exhaustive list of battery types that may be used, include, but are not limited to, lithium batteries, lithium sulphur batteries, alkaline batteries, solid state batteries, graphite based batteries, magnesium based batteries, fluoride based batteries, sodium based batteries, or other types of batteries, or combinations thereof.

For the purposes of this disclosure, the term "battery cell" may generally refer to cells in a battery assembly where chemical reactions occur. For example, these chemical reactions may create a flow of electrons. A battery cell may include an anode, a cathode, and an electrolyte. In some examples, when an anode and a cathode of a battery cell are connected to a circuit, a chemical reaction causes electrons to flow into the circuit. In some examples, the battery cells may be individually compartmentalized and be stackable within a rigid casing of a battery assembly. For example, the battery cells may be stacked in a manner so that the anode of a first battery cell contacts the cathode of an adjacent battery cell. This may allow the multiple battery cells to collectively provide a flow of electrons into a circuit. In some cases, each of the battery cells of a battery assembly have a cylindrical shape. In other examples, the shape of the battery cells is prismatic. In accordance with the principles described in this disclosure, the battery cells may include any appropriate shape, including cylindrical, prismatic, rectangular, cubical, triangular, circular, ovular, symmetric, asymmetric, other shapes, or combinations thereof. In some cases, at least some individual battery cells are enclosed by a rigid structure, and a collection of these individual battery cells are stacked within the rigid casing of the battery assembly. In other examples, the battery cells may be each encompassed with a flexible pouch. The swell detection circuitry described in the present disclosure may be used to detect swelling of battery cells with hard structures, flexible pouches, or other types of coverings, or combinations thereof.

For the purposes of this disclosure, the term "system board" may generally refer to printed circuit board that includes at least some of the main electronic components of the portable electronic device and has input/outputs into which other circuit boards or other components of the portable electronic device can be connected. In some cases, the mother board may include, but is not limited to, a central processing unit, memory, embedded controllers, subsystems, interface connectors, fans, heat sinks, power connectors, other components, or combinations thereof.

For the purposes of this disclosure, the term "power management circuitry" may generally refer to hardware, software, and/or firmware located in the battery assembly that is involved in managing the operation of the battery. In some cases, the power management circuitry may include sensors, positive and negative terminals, ground wires, logic, clocks, memory storage, thermistors, controller chips, connectors, other types of hardware, or combinations thereof. In some examples, the power management circuitry may sense how much power is left in at least one of the battery cells, balance charging between the battery cells, sense the temperature of at least one of the battery cells, stored battery parameters, monitor charging, control the charging order, provide other functions, or combinations thereof.

For the purposes of this disclosure, the term "touch input component" may generally refer to components that allow a user to provide an input to the portable electronic device through a touch or proximity input. Often, these touch input components may include self-capacitance devices, mutual capacitance devices, capacitance devices, other types of device, or combinations thereof. A non-exhaustive list of touch input components may include, but is not limited to, touch pads, touch screens, other types of touch input components, or combinations thereof.

For the purposes of this disclosure, the term "touch logic circuitry" may generally refer to logic that is incorporated into the touch input component that can interpret the measurements coming from the electrodes of the touch input component. In some cases, the interpretation of these measurements are sent to an embedded processor or another subsystem located on a system board of the portable electronic device.

FIG. 1 depicts an example of a portable electronic device 100. In this example, the portable electronic device is a laptop. In the illustrated example, the portable electronic device 100 includes input components, such as a keyboard 102 and a touch pad 104. The portable electronic device 100 also includes a display 106. A program operated by the portable electronic device 100 may be depicted in the display 106 and controlled by a sequence of instructions that are provided by the user through the keyboard 102 and/or through the touch pad 104. An internal battery (not shown) may be used to power the operations of the portable electronic device 100.

The keyboard 102 includes an arrangement of keys 108 that can be individually selected when a user presses on a key with a sufficient force to cause the key 108 to be depressed towards a switch located underneath the keyboard 102. In response to selecting a key 108, a program may receive instructions on how to operate, such as a word processing program determining which types of words to process. A user may use the touch pad 104 to add different types of instructions to the programs operating on the computing device 100. For example, a cursor depicted in the display 106 may be controlled through the touch pad 104. A user may control the location of the cursor by sliding his or her hand along the surface of the touch pad 104. In some cases, the user may move the cursor to be located at or near an object in the computing device's display and give a command through the touch pad 104 to select that object. For example, the user may provide instructions to select the object by tapping the surface of the touch pad 104 one or more times.

The touch pad 104 may include a capacitance sensor disposed underneath a surface containing the keyboard 102. In some examples, the touch pad 104 is located in an area of the keyboard's surface where the user's palms may rest while typing. The capacitance sensor may include a printed circuit board that includes a first layer of electrodes oriented in a first direction and a second layer of electrodes oriented in a second direction that is transverse the first direction. These layers may be spaced apart and/or electrically isolated from each other so that the electrodes on the different layers do not electrically short to each other. Capacitance may be measured at the overlapping intersections between the electrodes on the different layers. However, as the user's finger or other electrically conductive objects approach the intersections, the capacitance may change. These capacitance changes and their associated locations may be quantified to determine where the user is touching or hovering his or her finger within the area of the touch pad 104. In some examples, the first set of electrodes and the second set of electrodes are equidistantly spaced with respect to each other. Thus, in these examples, the sensitivity of the touch pad 104 is the same in both directions. However, in other examples, the distance between the electrodes may be non-uniformly spaced to provide greater sensitivity for movements in certain directions.

In some cases, the display 106 is mechanically separate and movable with respect to the keyboard with a connection mechanism 114. In these examples, the display 106 and keyboard 102 may be connected and movable with respect to one another. The display 106 may be movable within a range of 0 degrees to 180 degrees with respect to the keyboard 102. In some examples, the display 106 may fold over onto the upper surface of the keyboard 102 when in a closed position, and the display 106 may be folded away from the keyboard 102 when the display 106 is in an operating position. In some examples, the display 106 may be orientable with respect to the keyboard 102 at an angle between 35 to 135 degrees when in use by the user. However, in these examples, the display 106 may be positionable at any angle desired by the user.

In some examples, the display 106 may be a non-touch sensitive display. However, in other examples at least a portion of the display 106 is touch sensitive. In these examples, the touch sensitive display may include a capacitance sensor that is located behind an outside surface of the display 106. As a user's finger or other electrically conductive object approaches the touch sensitive screen, the capacitance sensor may detect a change in capacitance as an input from the user.

Figure 2:
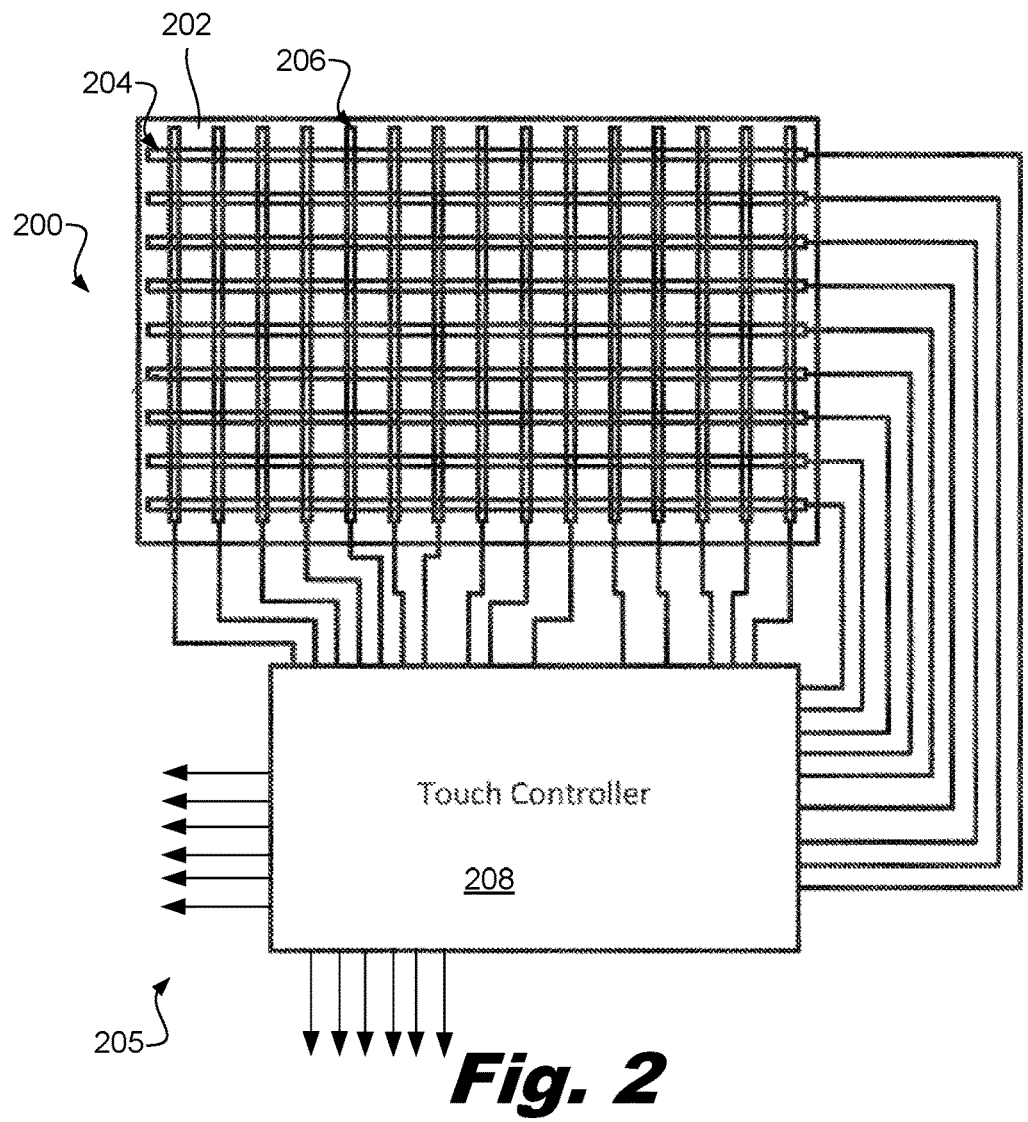
FIG. 2 depicts an example of a substrate with a first set of electrodes and a second set of electrodes in accordance with the disclosure.

FIG. 2 depicts an example of a portion of a touch input component 200. In this example, the touch input component 200 may include a substrate 202, first set 204 of electrodes, and a second set 206 of electrodes. The first and second sets 204, 206 of electrodes may be oriented to be transverse to each other. Further, the first and second sets 204, 206 of electrodes may be electrically isolated from one another so that the electrodes do not short to each other. However, where electrodes from the first set 204 overlap with electrodes from the second set 206, capacitance can be measured. The touch input component 200 may include one or more electrodes in the first set 204 or the second set 206. Such a substrate 200 and electrode sets may be incorporated into a touch screen, a touch pad, and/or swell detection circuitry incorporated into a battery assembly.

In some examples, the touch input component 200 is a mutual capacitance sensing device. In such an example, the substrate 202 has a set 204 of row electrodes and a set 206 of column electrodes that define the touch/proximity-sensitive area of the component. In some cases, the component is configured as a rectangular grid of an appropriate number of electrodes (e.g., 8-by-6, 16-by-12, 9-by-15, or the like).

As shown in FIG. 2, the touch input controller 200 includes a touch controller 208. The touch controller 208 may include at least one of a central processing unit (CPU), a digital signal processor (DSP), an analog front end (AFE) including amplifiers, a peripheral interface controller (PIC), another type of microprocessor, and/or combinations thereof, and may be implemented as an integrated circuit, a field programmable gate array (FPGA), an application specific integrated circuit (ASIC), a combination of logic gate circuitry, other types of digital or analog electrical design components, or combinations thereof, with appropriate circuitry, hardware, firmware, and/or software to choose from available modes of operation.

In some cases, the touch controller 208 includes at least one multiplexing circuit to alternate which of the sets 204, 206 of electrodes are operating as drive electrodes and sense electrodes. The driving electrodes can be driven one at a time in sequence, or randomly, or multiple at the same time in encoded patterns. Other configurations are possible such as a self-capacitance mode where the electrodes are driven and sensed simultaneously. Electrodes may also be arranged in non-rectangular arrays, such as radial patterns, linear strings, or the like. A ground plane shield (see FIG. 3) may be provided beneath the electrodes to reduce noise or other interference. The shield may extend beyond the grid of electrodes. Other configurations am also possible.

In some cases, no fixed reference point is used for measurements. The touch controller 208 may generate signals that are sent directly to the first or second sets 204, 206 of electrodes in various patterns.

In some cases, the component does not depend upon an absolute capacitive measurement to determine the location of a finger (or stylus, pointer, or other object) on a surface of the touch input component 200. The touch input component 200 may measure an imbalance in electrical charge to the electrode functioning as a sense electrode which can, in some examples, be any of the electrodes designated in either set 204, 206 or, in other examples, with dedicated-sense electrodes. When no pointing object is on or near the touch input component 200, the touch controller 208 may be in a balanced state, and there is no signal on the sense electrode. When a finger or other pointing object creates imbalance because of capacitive coupling, a change in capacitance may occur at the intersections between the sets of electrodes 204, 206 that make up the touch/proximity sensitive area. In some cases, the change in capacitance is measured. However, in alternative example, the absolute capacitance value may be measured.

While this example has been described with the touch input component 200 having the flexibility of the switching the sets 204, 206 of electrodes between sense and transmit electrodes, in other examples, each set of electrodes is dedicated to either a transmit function or a sense function.

In the example depicted in FIG. 2, some of the electrical connections 205 are depicted extending from the touch controller 208 to connect to another substrate with multiple sets of electrodes associated with a battery assembly as part of the battery assembly's swell detection circuitry.

Figure 3:
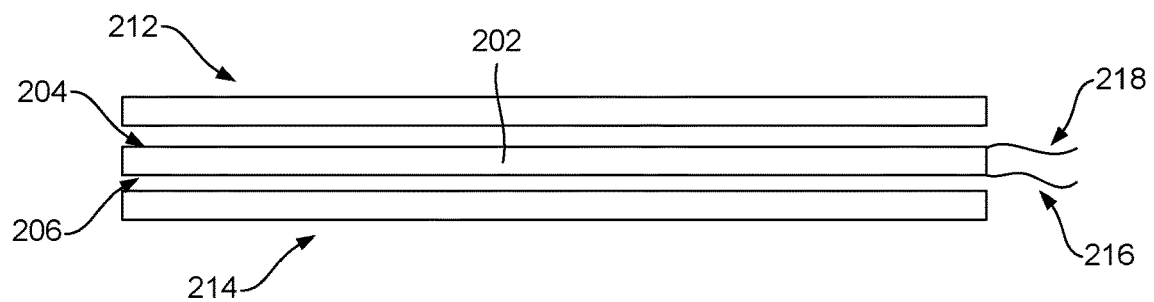
FIG. 3 depicts an example of a touch pad in accordance with the disclosure.

FIG. 3 depicts an example of a substrate 202 with a first set 204 of electrodes and a second set 206 of electrodes deposited on the substrate 202 that is incorporated into a touch pad. The first set 204 of electrodes and the second set 206 of electrodes may be spaced apart from each other and electrically isolated from each other. In the example depicted in FIG. 3, the first set 204 of electrodes is deposited on a first side of the substrate 202, and the second set 206 of electrodes is deposited on the second side of the substrate 202, where the second side is opposite the first side and spaced apart by the thickness of the substrate 200. The substrate may be made of an electrically insulating material thereby preventing the first and second sets 204, 206 of electrodes from shorting to each other. As depicted in FIG. 2, the first set 204 of electrodes and the second set 206 of electrodes may be oriented transversely to one another. Capacitance measurements may be taken where the intersections with the electrodes from the first set 204 and the second set 206 overlap. In some examples, a voltage may be applied to the transmit electrodes and the voltage of a sense electrode that overlaps with the transmit electrode may be measured. The voltage from the sense electrode may be used to determine the capacitance at the intersection where the sense electrode overlaps with the transmit electrode.

In the example of FIG. 3 depicting a cross section of a touch pad, the substrate 202 may be located between a touch surface 212 and a shield 214. The touch surface 212 may be a covering that is placed over the first side of the substrate 202 and that is at least partially transparent to electric fields. As a user's finger or stylus approach the touch surface 212, the presence of the finger or the stylus may affect the electric fields on the substrate 202. With the presence of the finger or the stylus, the voltage measured from the sense electrode may be different than when the finger or the stylus are not present. As a result, the change in capacitance may be measured.

The shield 214 may be an electrically conductive layer that shields electric noise from the internal components of the portable electronic device. This shield may prevent influence on the electric fields on the substrate 202.

The voltage applied to the transmit electrodes may be carried through an electrical connection 216 from the touch controller 208 to the appropriate set of electrodes. The voltage applied to the sense electrode through the electric fields generated from the transmit electrode may be detected through the electrical connection 218 from the sense electrodes to the touch controller 208.

Figure 4:
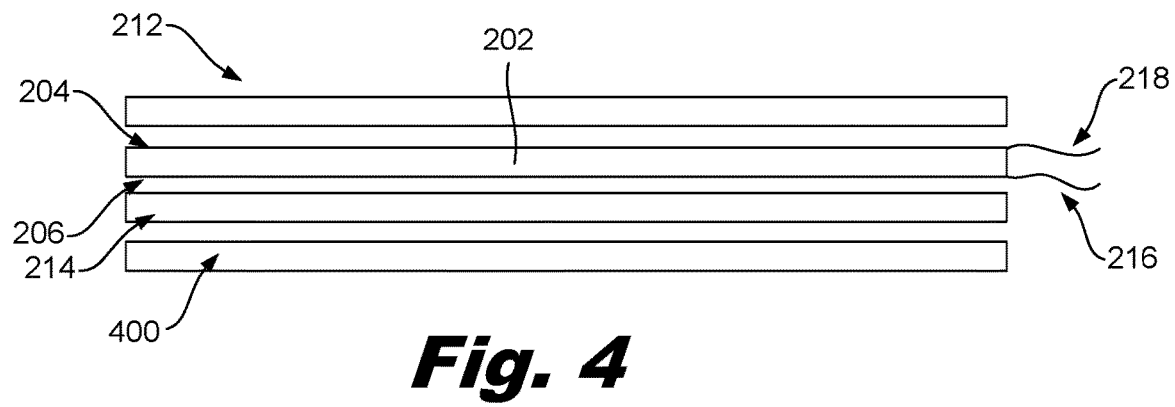
FIG. 4 depicts an example of a touch screen in accordance with the disclosure.

FIG. 4 depicts an example of a touch screen as the touch input controller. In this example, the substrate 202, sets of electrodes 204, 206, and electrical connections 216, 218 may be similar to the arrangement described in conjunction with FIG. 3. In the example of FIG. 4, the shield 214 is located between the substrate 202 and a display 400. The display 400 may be a layer of pixels or diodes that illuminate to generate an image. The display may be a liquid crystal display, a light emitting diode display, an organic light emitting diode display, an electroluminescent display, a quantum dot light emitting diode display, an incandescent filaments display, a vacuum florescent display, a cathode gas display, another type of display, or combinations thereof. In this example, the shield 208, the substrate 202, and the touch surface 212 may all be at least partially transparent to allow the display to be visible to the user through the touch surface 212. Such a touch screen may be included in a monitor, a display assembly, a laptop, a mobile phone, a mobile device, an electronic tablet, another type of portable electronic device, or combinations thereof.

Figure 5:
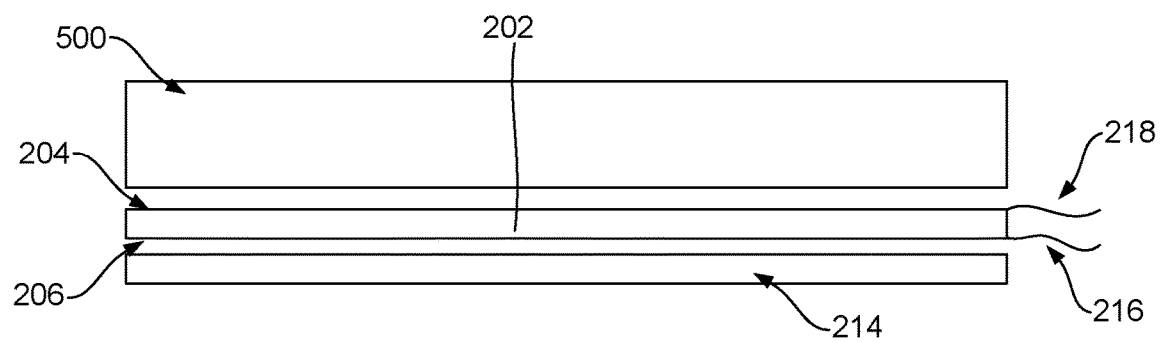
FIG. 5 depicts an example of a battery assembly in accordance with the disclosure.

FIG. 5 depicts an example of swell detection circuitry incorporated into a battery assembly. The substrate 202, sets of electrodes 204, 206, electrical connections 216, 218, and shield 214 may be similar to the arrangement described in conjunction with FIG. 3. In the example of FIG. 5, a touch surface may not be incorporated into the swell detection circuitry. A battery cell 500 may be positioned adjacent to the substrate 202. In the illustrated example, the substrate 202 is located between the shield 214 and the battery cell 500. The shield may prevent electrical interference from the battery management circuitry or other types of components within the battery assembly or within the portable electronic device. The substrate 202 may be fixed with respect to distance from the battery cell 500. At this fixed distance, the capacitance measured between the electrodes of the first and second sets 204, 206 may form a baseline capacitance measurement. However, if the distance between the battery cell and the substrate narrows, the capacitance measurements may change.

For example, if the battery cell expands due to internal outgassing, the edges of the battery cell may move closer to the substrate 202. As a result, the electrodes on the substrate 202 may measure a change in capacitance. In some cases, the battery cell may have metal component, such as anode and cathodes, which may move closer to the substrate 202 when the battery cell swells, and these electrically conductive components may be detected by the changes in the capacitance. In other examples, the flow of electrons from different parts of the battery may be detected differently when the battery is swollen resulting in changes in capacitance. In some situations, the movement of the flexible pouch or more rigid structure of the battery cell 500 may cause changes in the measured capacitance. In yet another example, the flexible pouch or the rigid structure of the battery cell may be enhanced with an electrically conductive material to increase the sensitivity to detect movement of the battery cell through changes in the capacitance measurements.

In some examples, the voltage may be transmitted to the transmit electrode from the touch controller 208 through electrical connection 216, which may be located in the touch input controller, not the battery assembly. In such an example, the touch controller 208 may control the parameters (strength, frequency, and sequence) of the transmit signals for both the touch input component and the swell detection circuitry of the battery assembly. Further, the electrical connection 218 may connect the sense electrodes to the touch controller 208 to have the measured voltage interpreted into a capacitance value. In such an example, the touch controller 208 may interpret the measurements from both the substrate of the touch input controller and the substrate of the swell detection circuitry. In an additional example, the capacitance measurements may detect movement of the internal metal layers of the battery cell.

Figure 6:
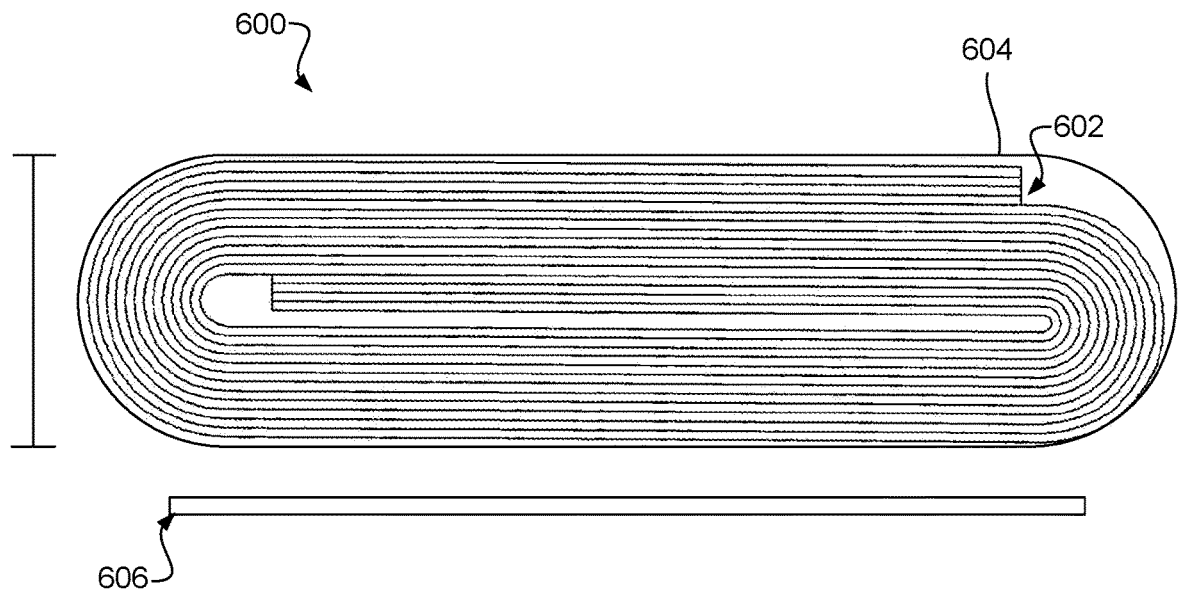
FIG. 6 depicts an example of a battery cell in accordance with the disclosure.

FIG. 6 depicts a cross section of an example of a battery cell 600. In this example, the battery cell 600 includes multiple metal layers 604 arranged side by side and rolled together. The metal layers are disposed within a pouch 604. In this example, swell detection circuitry 606 is adjacent from the battery cell 600.

Figure 7:
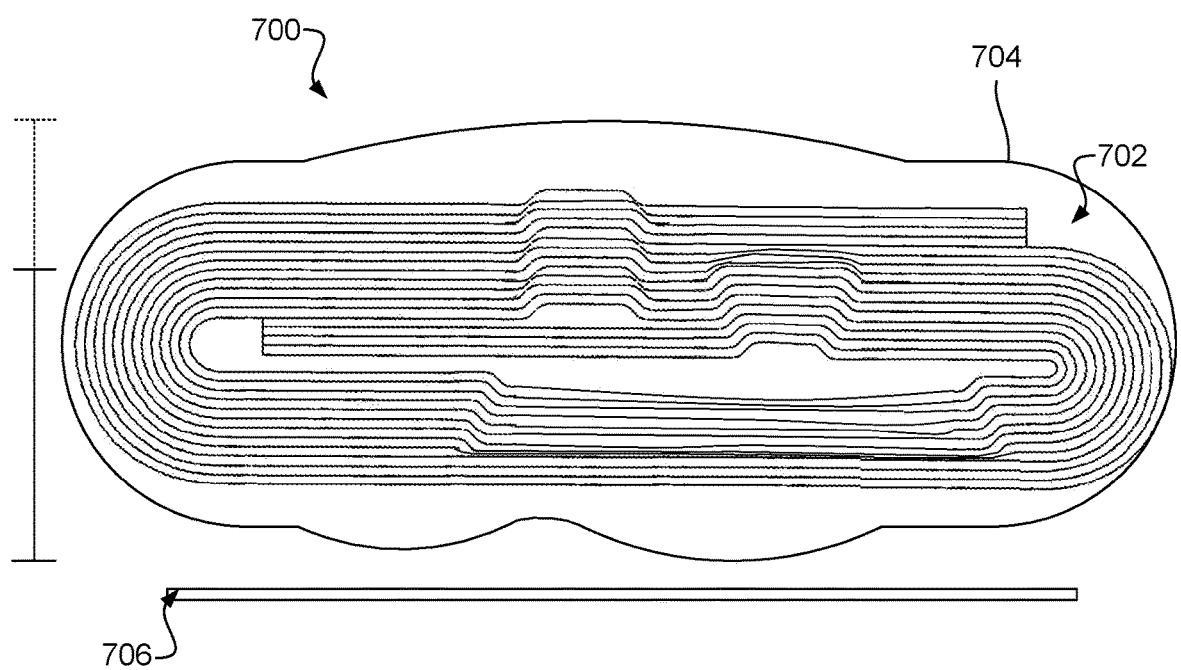
FIG. 7 depicts an example of a swollen battery cell in accordance with the disclosure.

FIG. 7 depicts an example of a swollen battery 700 due to out gassing from the metal layers 702. In this example, the gas increases the pressure between the metal layers 702 causing separation between the metal layers. Additionally, the increased internal pressure may also expand the flexible pouch 704 (or rigid structure in other examples) outward. Separation between the metal layers 702 and/or expansion of the pouch 704 may increase the battery's overall size and therefore narrow the gap between the battery cell and the swell detection circuitry 706.

Figure 8:
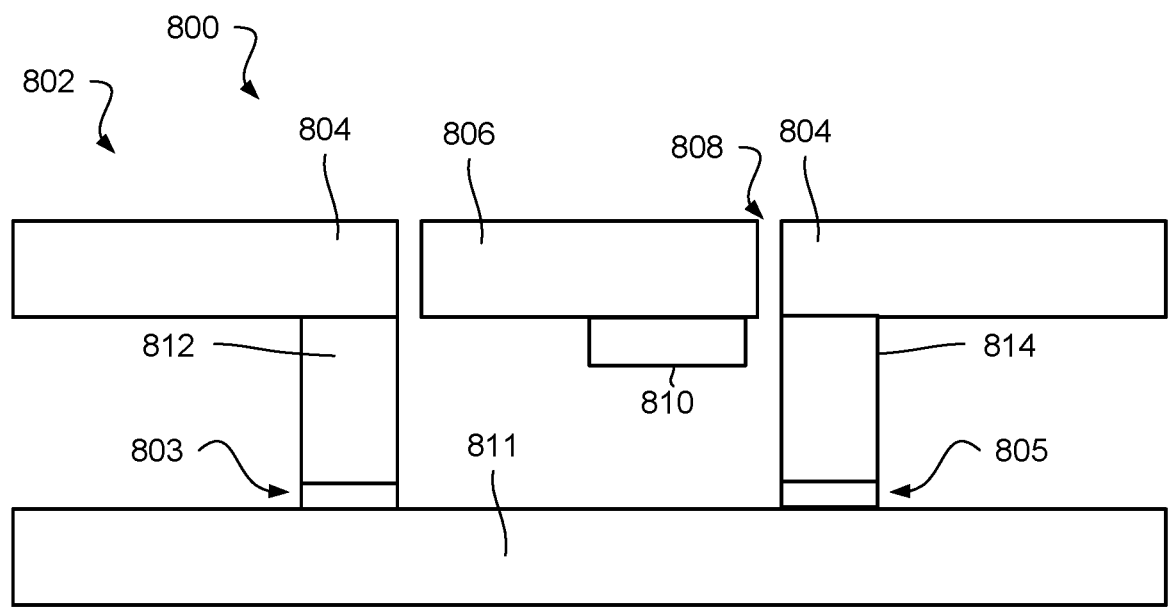
FIG. 8 depicts an example of a battery assembly in a portable electronic device in accordance with the disclosure.

FIG. 8 depicts an example of a swell detection circuitry 800 incorporated into an electronic device 802. In this example, the swell detection circuitry 800 includes a first substrate 803 and a second substrate 805 incorporated into a structure of the electronic device 802.

The electronic device 802 includes a keyboard surface 804 and a track pad 806 positioned in an opening 808 defined in the keyboard surface 804, and a touch controller 810 incorporated into the track pad 806. The track pad 806 may include a substrate that includes at least one electrode for determining a proximity input over the track pad 806 or a touch input on to the touch pad 806. The touch controller 810 may determine capacitance measurements from the electrode to determine the proximity and/or touch inputs of the track pad 806.

The first substrate 803 and the second substrate 804 may be positioned to detect a size change in a battery assembly 811 of the electronic device 802. The first substrate 803 may be positioned between a first internal structure 812 of the electronic device's structure, and the second substrate 805 may be positioned between a second internal structure 814 of the electronic device's structure. Each of the first internal structure 812 and the second internal structure 814 may provide a surface on which the respective first and second substrate 803, 805 may be located adjacent to portions of a battery assembly 811.

In this example, the first substrate 803 and the substrate 805 may be in communication with a dedicated controller for interpreting their respective measurements. In some examples, the first substrate 803 and the second substrate 805 may be in communication with the touch controller 810 for the track pad 806, which has touch logic circuitry to interpret the change in the capacitance in the respective substrates 803, 805.

Figure 9:
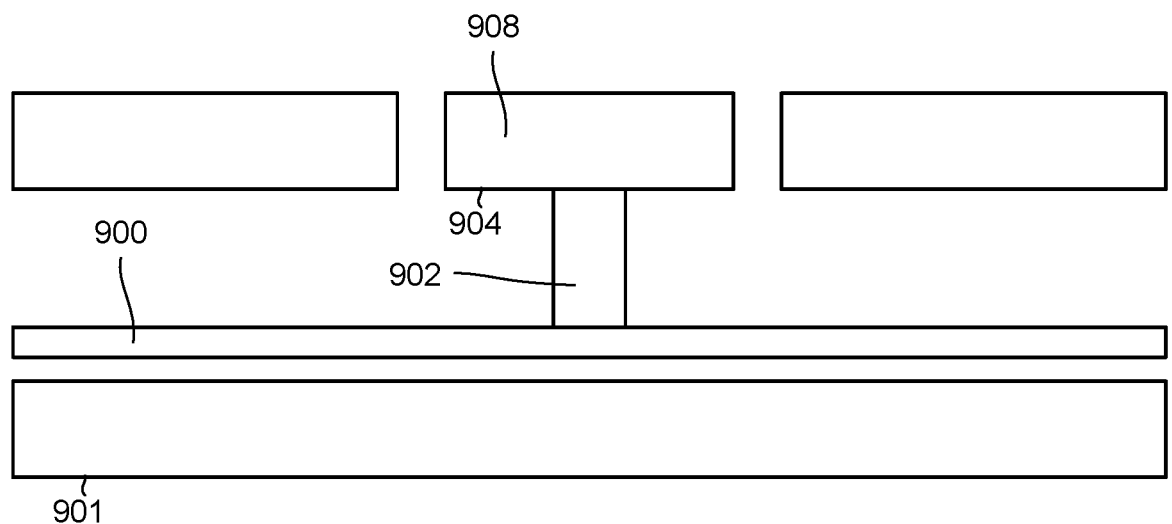
FIG. 9 depicts an example of a battery assembly in a portable electronic device in accordance with the disclosure.

In the illustrated example of FIG. 8, the region of the battery assembly 811 immediately subjacent to the track pad 806 is void of swell detection circuitry. However, in the embodiment illustrated in FIG. 9, a substrate 900 of swell detection circuitry is positioned over the length of the battery assembly 901. The substrate 900 may include components and arrangements similar to the arrangements described in conjunction with the examples from FIG. 5 or another type of swell detection circuitry configured to detect size changes in battery cells. In this example, a connector 902 connects the substrate 900 to the underside 904 of the track pad 908 or to another appropriate location within the portable electronic device. The connector 902 may include a structure that provides rigid support the substrate 900. In some examples, the connector 902 may electrically connect the substrate 900 to the touch controller to interpret the capacitance changes.

Figure 10:
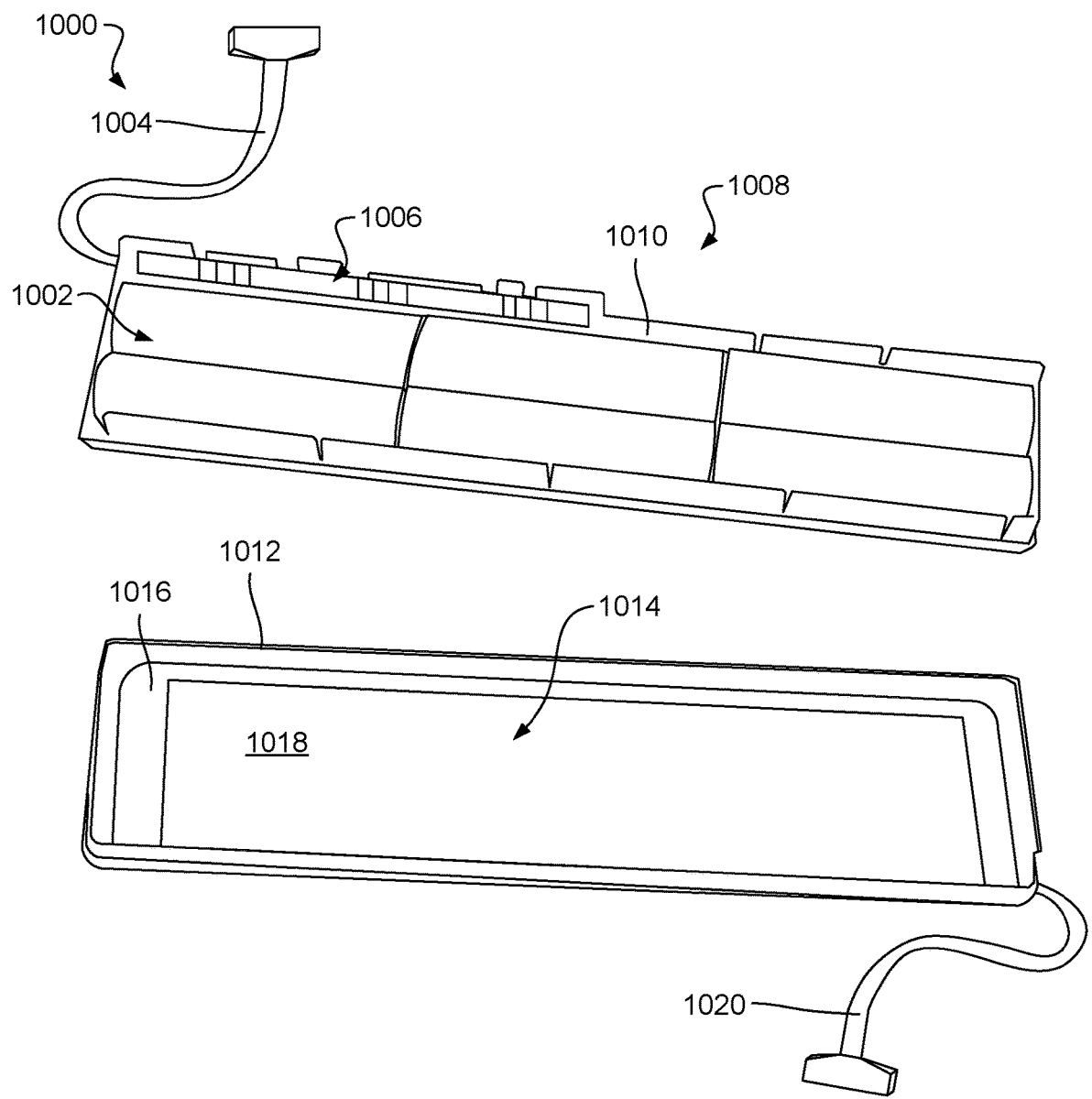
FIG. 10 depicts an example of a battery assembly in accordance with the disclosure.

FIG. 10 depicts an example of a battery assembly 1000. In this example, the battery assembly 1000 includes multiple battery cells 1002 stacked against each other. These battery cells 1002 are arranged to allow electricity to flow from the battery cells 1002 to a first electrical connector 1004 that is configured to connect to a system board of the portable electronic device. Also included in the battery assembly 1000 is power management circuitry 1006. This circuitry 1006 may be used to sense how much power is left in at least one of the battery cells, balance charging between the battery cells, sense the temperature of at least one of the battery cells, stored battery parameters, monitor charging, control the charging order, perform other functions, or combinations thereof. The data from the power management circuitry 1006 may also be communicated to processing resources on the system board through the first connector 1004.

The battery assembly 1000 may include a rigid casing 1008. In the illustrated example, the rigid casing 1008 includes two shell portions 1010, 1012 that fit together and form an internal cavity, in which the battery cells 1002 reside. In this example, the battery cells 1002 and the power management circuitry 1006 are depicted in the first shell portion 1010. Swell detection circuitry 1014 is depicted attached to an internal surface 1016 of the second shell portion 1012. While this example depicts a rigid casing with two shells, in other examples, any appropriate number of shells may be part of the rigid casing. Also, while the illustrated examples include the swell detection circuitry on a different shell from the power management circuitry, these circuits may be included on the same shell, may overlap with each other, may be side by side, or arranged together in a different fashion.

In this example, a substrate 1018 of the swell detection circuitry 1014 is depicted covering most of the length and width of the internal surface 1016. In this example, the substrate's length and width may be space across multiple battery cells 1002. The substrate 1018 may include multiple sets of electrodes that cross at intersections which the capacitance is measured. Each of the intersections of may located in a physically different location on the substrate 1018. In this example, some of the intersections may be positioned adjacent to a first battery cell, which other intersections may be positioned to other battery cells. In the situation that the first battery cell swells, just those intersections adjacent to the first battery cell may measure a different amount of capacitance while the other intersections continue to measure a baseline capacitance or a near baseline capacitance. The touch logic circuitry may determine which battery cell within the battery cell is swollen and which ones aren't. As a result, a single substrate 1018 may be used to detect which of the battery cells is swelling.

The data of which battery cells swell, when the battery cell swells, what side of the battery cell is swelling, and other parameters of the battery cell swelling may be recorded. In some cases, the swelling may be linked to events on the portable electronic device. In some cases, the data may be sent to a central location where data from multiple portable electronic devices is gathered and analyzed to determine causes for the battery swell.

The data from the swell detection circuitry 1014 may be supplied to the touch input component through a second connector 1020. The touch logic circuitry of the touch input component may use the outputs from the swell detection circuitry 1014 to determine the capacitance at each intersection, determine changes in the capacitance from the baseline capacitances, determine which portion of the battery cells are swelling, determine which battery cell is swelling, determine other parameters, or combinations thereof.

The battery assembly 1000 depicted in the illustrated example may be inserted into an interior of the portable electronic device. The first connector 1004 may connect directly to the system board, and the second connector 1020 may connect directly to the touch input component.

Figure 11:
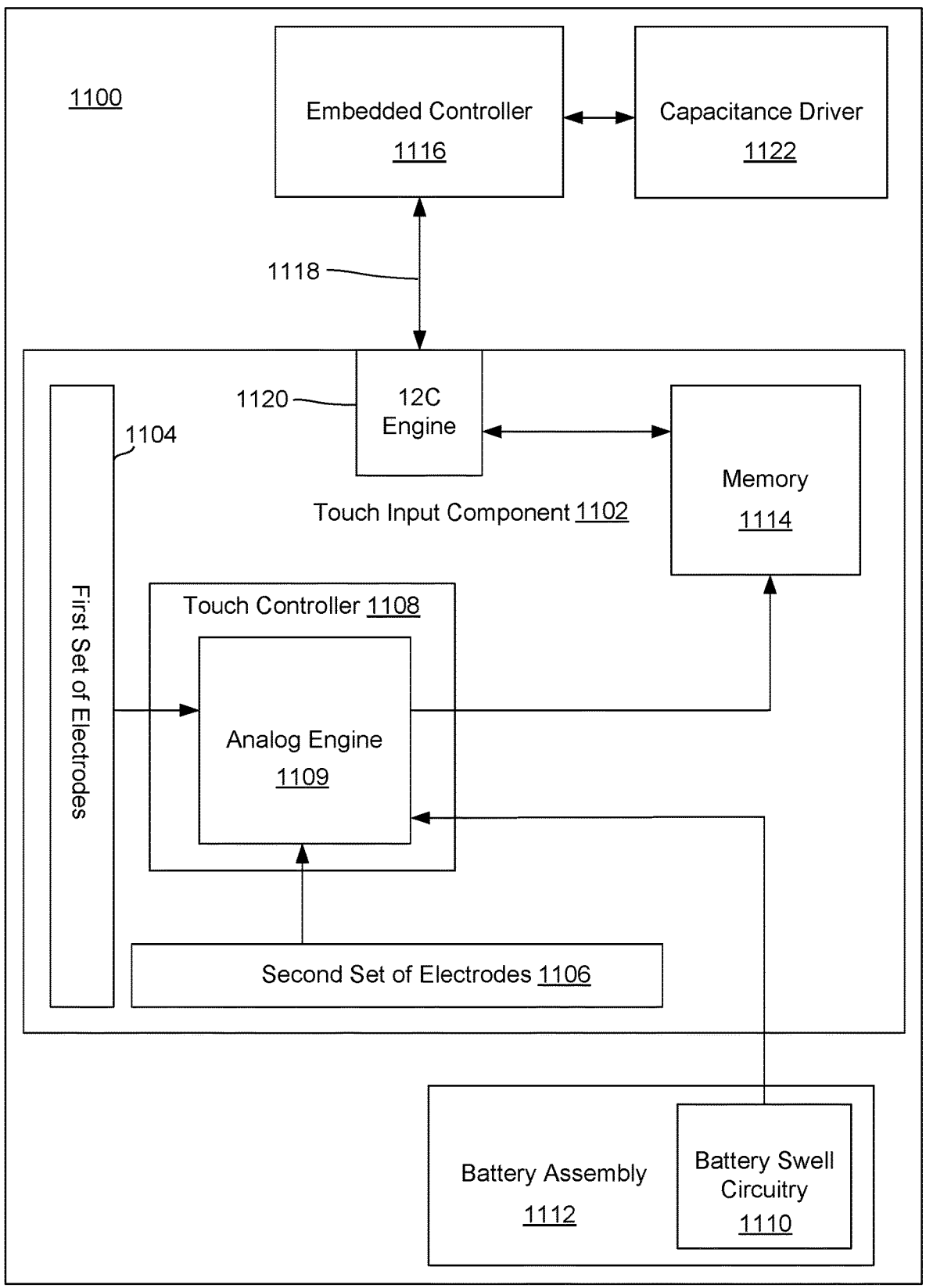
FIG. 11 depicts an example of a touch input component connected to swell detection circuitry in accordance with the disclosure.

FIG. 11 depicts an example of a portion of a portable electronic device 1100. In this example, the portable electronic device 1100 includes a touch input component 1102. The touch input component includes a first set 1104 of electrodes and a second set 1106 of electrodes connected to a touch controller 1108. In some cases, the touch controller includes an analog engine 1109 that can interpret the outputs from the first and second sets 1104, 1106 of electrodes. The swell detection circuitry 1110 from a battery assembly 1112 may also output measurements to the touch controller 1108, and the analog engine 1109 of the touch controller 1108 can interpret the measurements from the swell detection circuitry 1110.

The data analyzed by the analog engine 1109 of the touch controller 1108 may be stored in a memory 1114 local to the touch input component 1106. The outputs from the analog engine 1109 may be accessible to an embedded controller 1116, which may be connected to a system board of the portable electronic device 1100. The embedded controller 1116 may be in communication with the local memory 1114 of the touch input component 1106 through a 12C bus 1118 that connects to a 12C bus engine 1120 integrated into the touch input component 1106. While this example has been described with reference to using a 12C bus and a 12C engine, any appropriate type of bus, connectors, and appropriate types of engines may be used in accordance with the principles described herein.

The embedded controller 1116 may have access to instructions and commands on how to process the data from the touch analog engine 1109 from a capacitance driver 1122 located on the system board. In this example, the same hardware, firmware, and software used to interpret the touch inputs into the touch input component 1102 can be used to process the outputs from the swell detection circuitry 1110 of the battery assembly 1112. Using the same touch controller may reduce the overall amount of hardware, firmware, and software needed to execute the different processes of the portable electronic device 1100.

Figure 12:
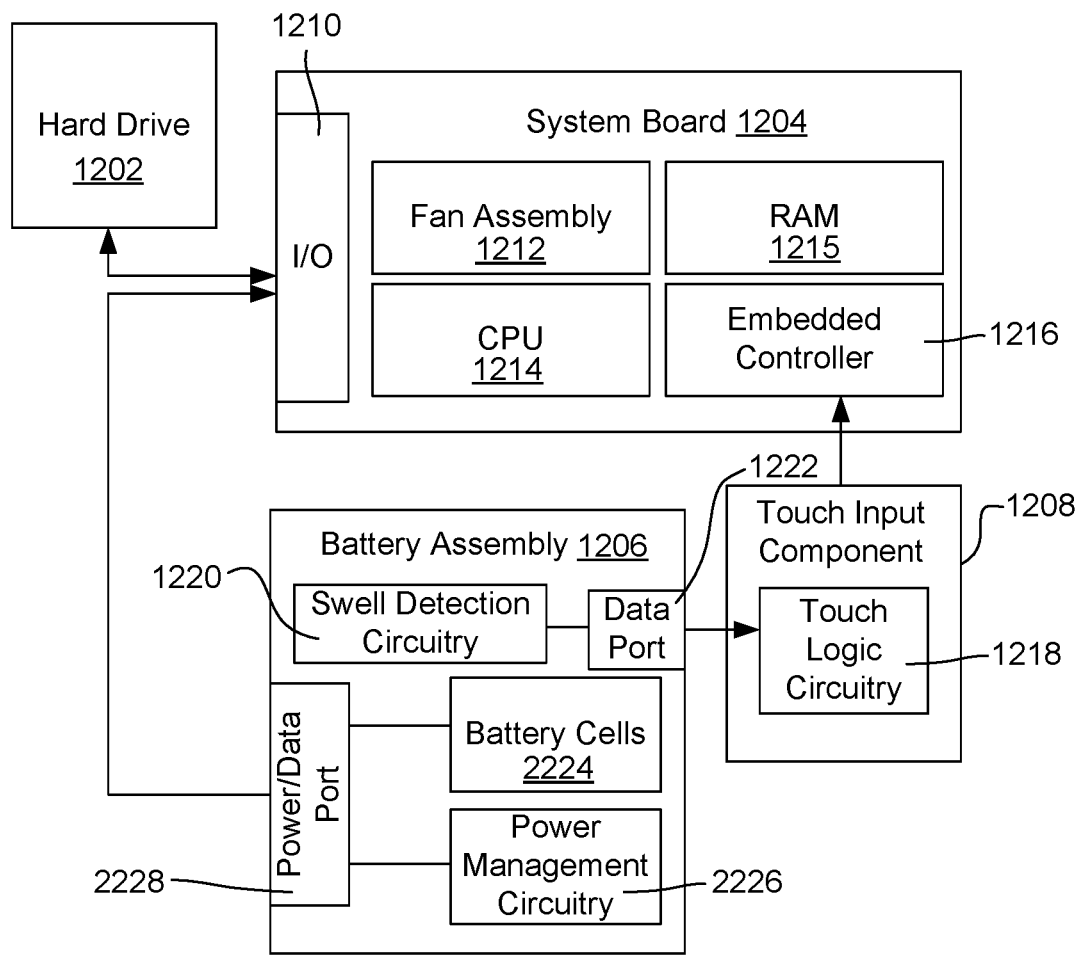
FIG. 12 depicts an example of a touch input component connected to swell detection circuitry in accordance with the disclosure.

FIG. 12 depicts another example of portions of a portable electronic device 1200. In this example, the portable electronic device 1200 includes a hard drive 1202, a system board 1204, a battery assembly 1206, and a touch input component 1208.

In this example, the system board 1204 includes input/outputs 1210, a fan assembly 1212, a central processor unit 1214, random access memory 1215, and an embedded controller 1216. While this example depicts specific components of the system board, other components may also be incorporated into the system board.

The touch input component 1208 includes touch logic circuitry 1218 of a touch controller and may include an analog engine. While this example depicts specific components of the touch input component, other components may also be incorporated into the touch input component.

The battery assembly 1206 may include swell detection circuitry 1220 connected to a data port 1222 that is electrically connected to the touch logic circuitry 1218 of the touch input component 1208. The battery assembly 1206 also includes battery cells 1224 and power management circuitry 2226 that are connected to power and data ports 2228 that are routed to the input/outputs 1210 of the system board 1204. In some cases, the input/output ports 1210 may route power to the central processing unit 1214 and/or other components of the system board 1204. While this example depicts specific components of the battery assembly, other components may also be incorporated into the battery assembly.

FIGS. 13-18 depict several non-limiting variations of where the substrate of the swell detection circuitry may be located with respect to the battery cells and rigid casing encompassing the battery cells. In these examples, the battery cells may include a flexible pouch that expands easily from internal pressure due to outgassing. In other examples, the battery cells may include a more rigid structure surrounding the electrolytes and other components of the battery cells. The more rigid structures may also expand due outward due to outgassing. However, in these examples with the more rigid structures surrounding the electrolyte and other components of the battery cell, these more rigid structures may be stacked together and located within the rigid casing. While these examples are depicted with a single battery cell, it is understood that each of these examples contemplate multiple battery cells stacked within the rigid casing.

Figure 13:
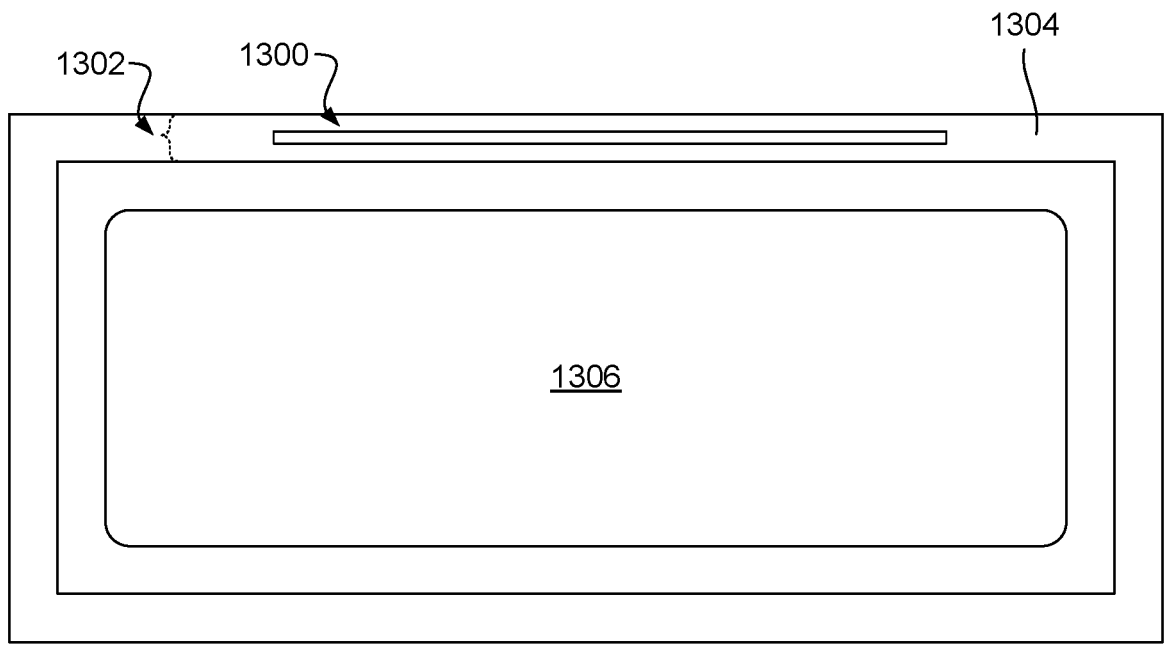
FIG. 13 depicts an example of swell detection circuitry embedded in casing of a battery assembly in accordance with the disclosure.

FIG. 13 depicts an example of the substrate 1300 being located within the thickness 1302 of the rigid casing 1304. In some examples, a pocket may be formed in the rigid casing 1304 to secure the substrate 1300. In other examples, the rigid casing 1304 may be molded around the substrate 1300. In this example, the portion of the casing material located between the substrate 1300 and the battery cell 1306 may be at least partially transparent to electric fields to allow for the detection of changes in capacitance due to changes in the battery cell's size.

Figure 14:
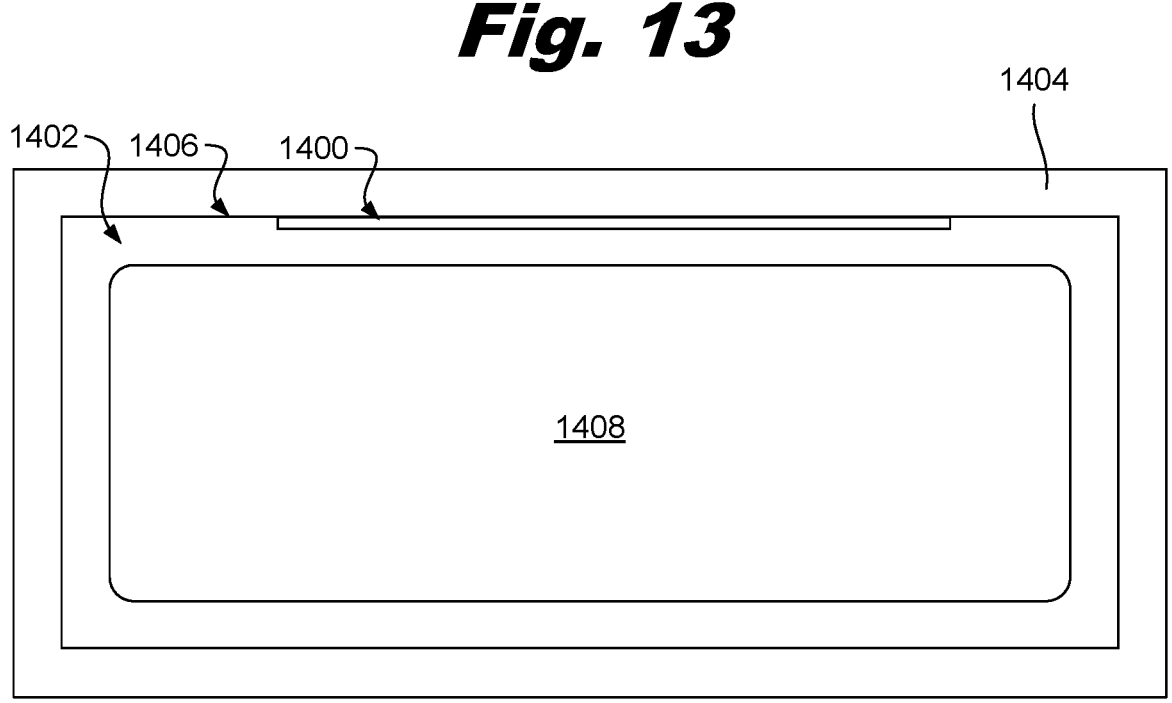
FIG. 14 depicts an example of swell detection circuitry within an interior of casing of a battery assembly in accordance with the disclosure.
Figure 15:
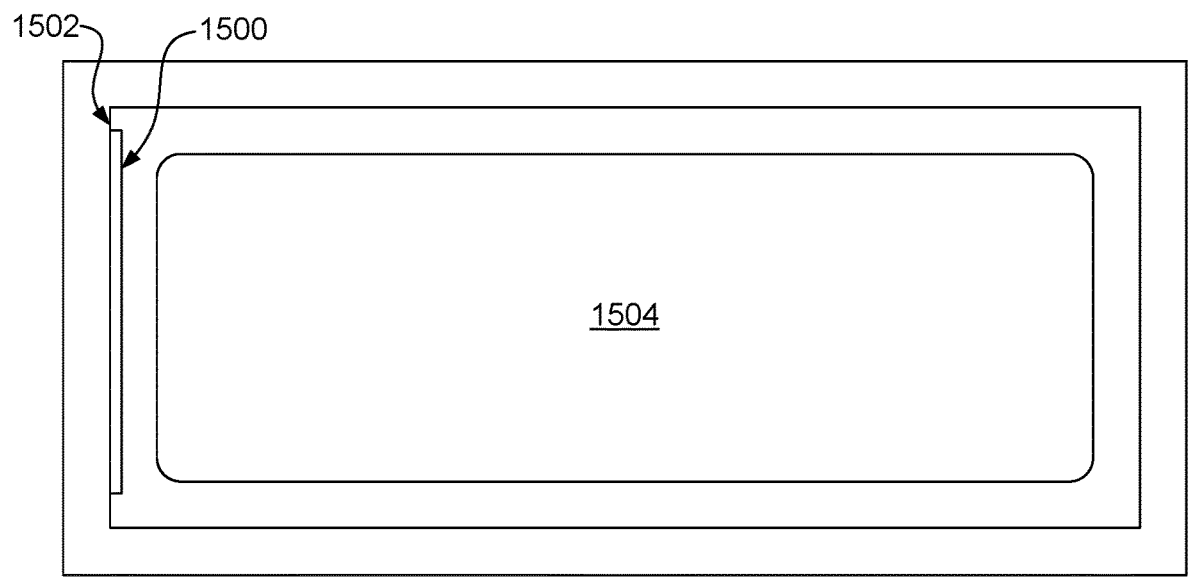
FIG. 15 depicts an example of swell detection circuitry attached to an interior wall of a casing of a battery assembly in accordance with the disclosure.
Figure 16:
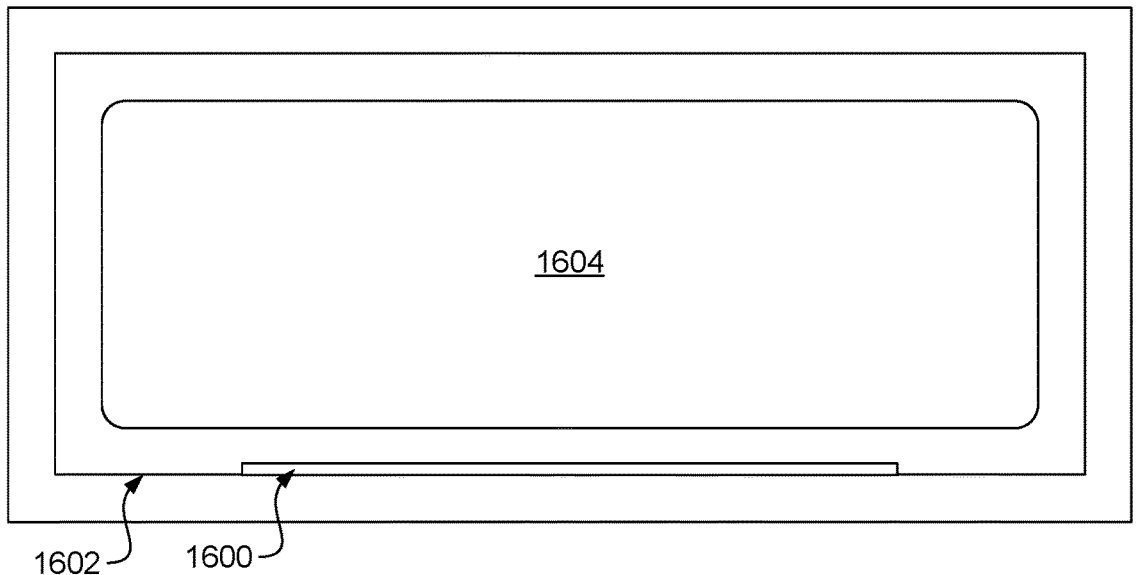
FIG. 16 depicts an example of swell detection circuitry attached to a floor of a casing of a battery assembly in accordance with the disclosure.

In the example of FIG. 14, the substrate 1400 is located within the interior cavity 1402 defined by the rigid casing 1404. In this example, the substrate 1400 is attached to an interior surface 1406 that is located above the battery cell 1408. The substrate 1500 depicted in FIG. 15 is attached to an internal surface 1502 that is located to the side of the battery cell 1504. The substrate 1600 depicted in FIG. 16 is attached to an internal surface 1602 that is located under the battery cell 1604.

Figure 17:
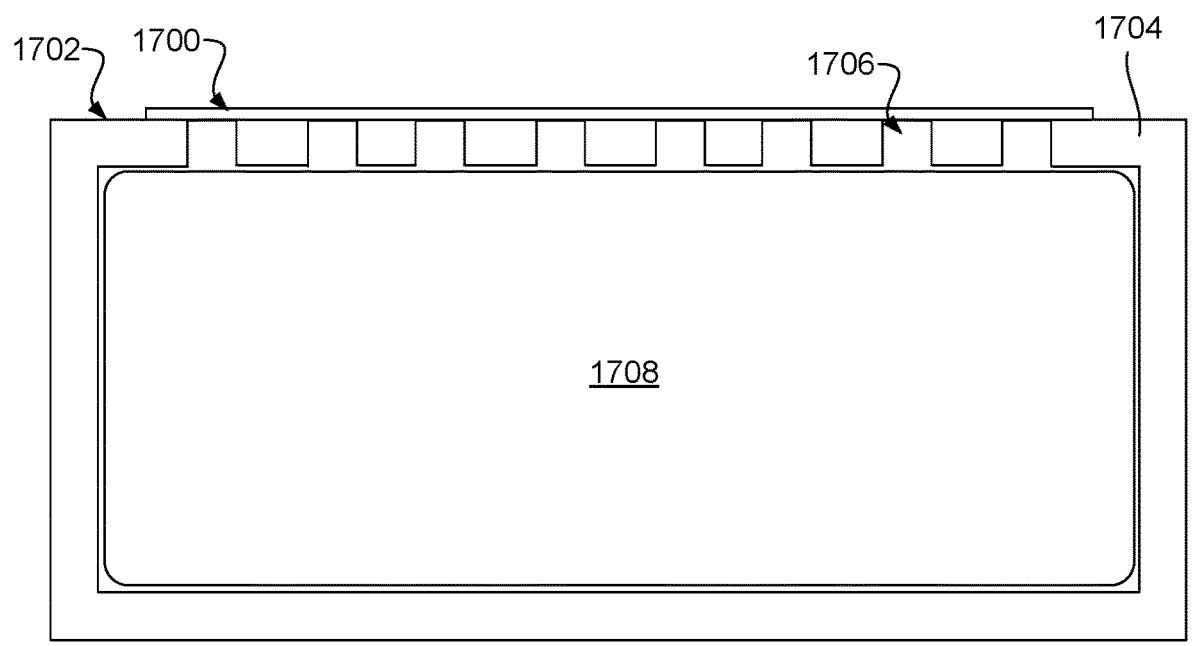
FIG. 17 depicts an example of swell detection circuitry attached to an exterior of a casing of a battery assembly in accordance with the disclosure.

In the example of FIG. 17, the substrate 1700 is attached to an exterior surface 1702 of the rigid casing 1704. In this example, the openings 1706 are defined in the exterior surface 1702, and the substrate 1700 is positioned over the openings 1706. In this example, the substrate may sense the changes in the battery cell's size through the openings 1706.

In some examples, the battery cell 1708 may substantially fill the volume of the internal cavity defined by the rigid casing 1704. In such an example, as the battery cell 1708 expands, the battery cell 1708 expands into at least one of the openings 1706. The opening 1706 may include a known diameter, depth, or other dimensional parameters that may be used in analyzing the capacitance measurements. For example, a capacitance measurement within one of the openings 1706 may be correlated with a specific pressure that can be determined because the dimensional parameters of the opening 1706 are known.

Figure 18:
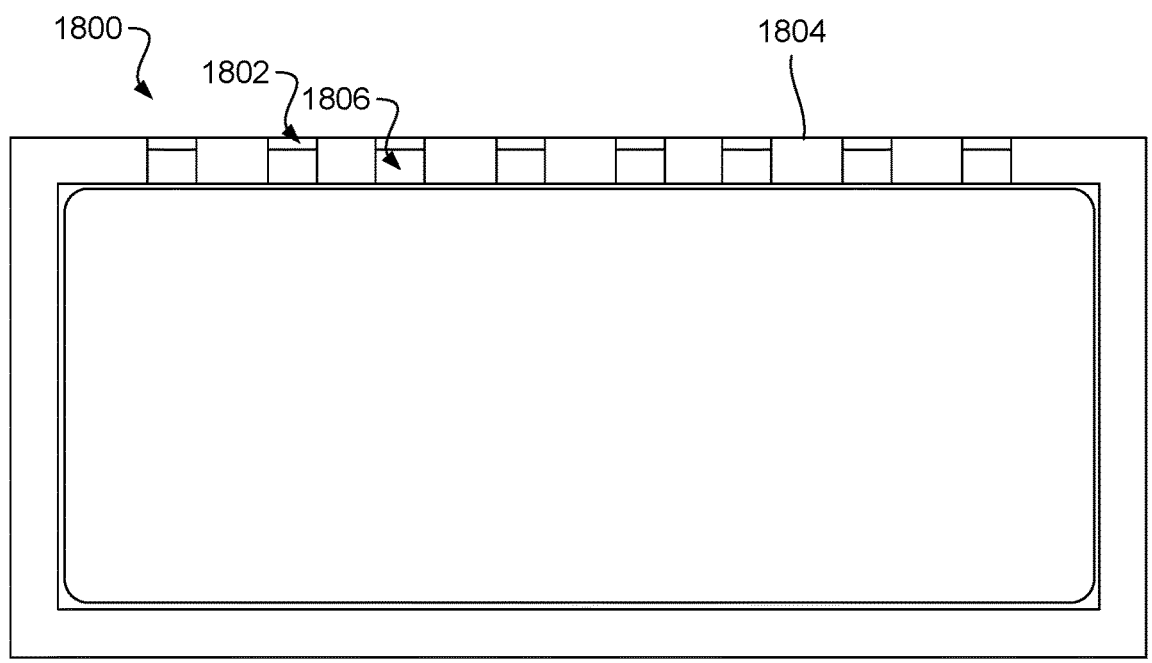
FIG. 18 depicts an example of swell detection circuitry attached within an opening defined by a thickness of a casing in accordance with the disclosure.

FIG. 18 depicts an example where the swell detection circuitry 1800 includes multiple substrates 1802. In this example, the exterior surface 1804 includes multiple openings 1806, and a separate substrate is located in each of the openings.

In the examples above, the rigid casing has been depicted with openings that extend through the entire thickness of the rigid casing's wall such that the openings are open to both the exterior surface and the interior surface of the casing's wall. However, in other examples, the openings may have a closed end that only extend a portion of the way through the casing wall's thickness. In such examples, the openings may be open to just the interior surface or the exterior surface.

In an alternative example, the substrate may be attached to an exterior surface that does not have openings. In such an example, the exterior surface may be at least partially transparent to electric fields so that the electrodes on the substrate can detect changes in the battery cell's size.

Figure 19:
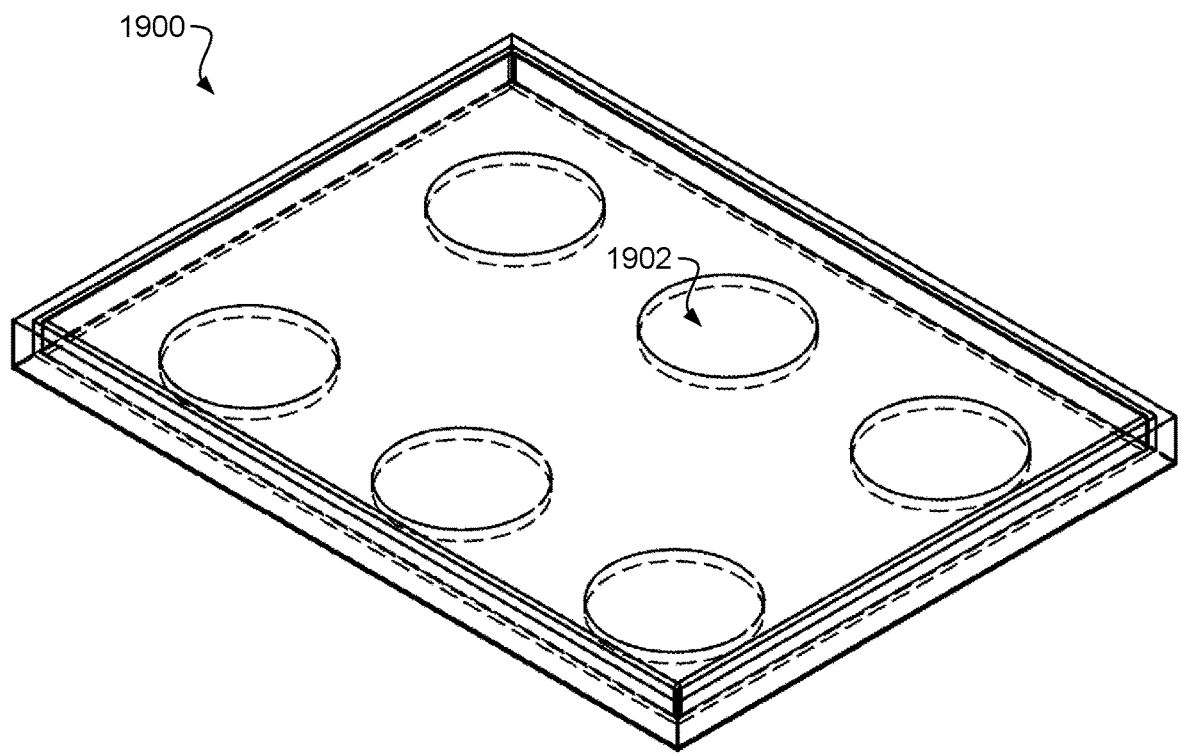
FIG. 19 depicts an example of through openings in a rigid casing of a battery assembly in accordance with the disclosure.

FIG. 19 depicts an example of a portion of a rigid casing 1900 with multiple through opening 1902 defined there though. In this example, swell detection circuitry can be positioned within at least one of the openings 1902.

Figure 20A:
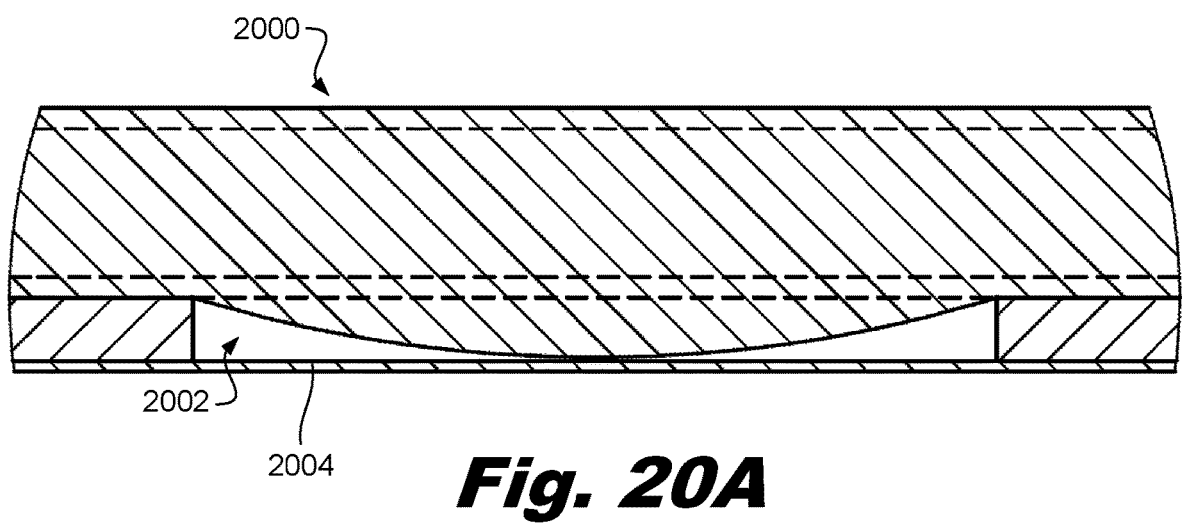
FIG. 20A depicts an example of swell detection circuitry detecting a swell of a battery cell through an opening in a battery assembly's casing in accordance with the disclosure.

FIG. 20A depicts an example of how the battery cell 2000 may expand into the void of the opening 2002. A substrate 2004 with electrodes for measuring changes in the battery cell's size and shape are depicted in the side of the opening opposite to the battery cell 2000. In this example, the pressure from the swelling battery cell 2000 causes the battery cell 2000 to bow outward into the opening and form a curve. In this example, the substrate 2004 may measure the different changes in capacitance so that the profile of the curve can be determined. In some cases, the touch logic circuitry may determine pressures, temperature, and other types of information about the condition of the battery cell 2000 based on the curve that is detected. For example, the touch circuitry may determine that some asymmetric profile curves represent shifting of the battery cell 2000 within the rigid casing rather than an increase in pressure. In such situations, the swell detection circuitry can distinguish a curve profile based on swelling or a curve formed due to different, potentially non-hazardous event.

Figure 20B:
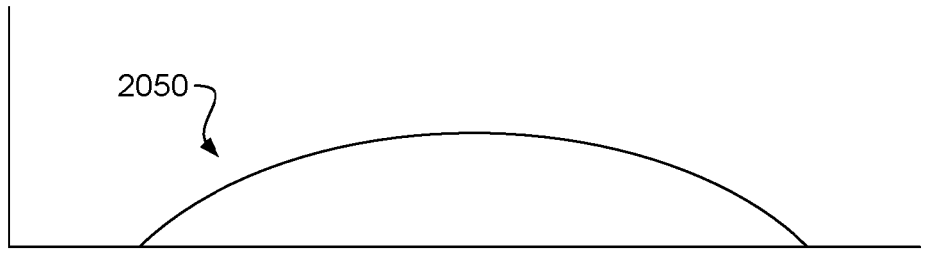
FIG. 20B depicts an example of two-dimensional battery cell profile depicting a uniform pressure in accordance with the disclosure.

FIG. 20B depicts an example of an expanded portion of the battery cell that is extending into an opening formed in the rigid casing of the battery assembly. In this example, the profile of the expanded portion exhibits a smooth curve and has a symmetric profile 2050. Such a profile may be interpreted by the touch logic circuitry to have an internal pressure that is exerting a uniform pressure on the internal side of the battery cell. Such characteristics may be interpreted to represent a battery cell experiencing an outgassing event. The touch logic circuitry may classify a battery cell with an expanded portion that is protruding into the opening as a potentially hazardous situation, and cause a message to be sent to take a remedial action. In some cases, the remedial action includes backing up data to a cloud; shutting the portable electronic device off; sending a warning notification to a user, manufacturer, a mobile device, and/or a third party; or combinations thereof.

Figure 20C:
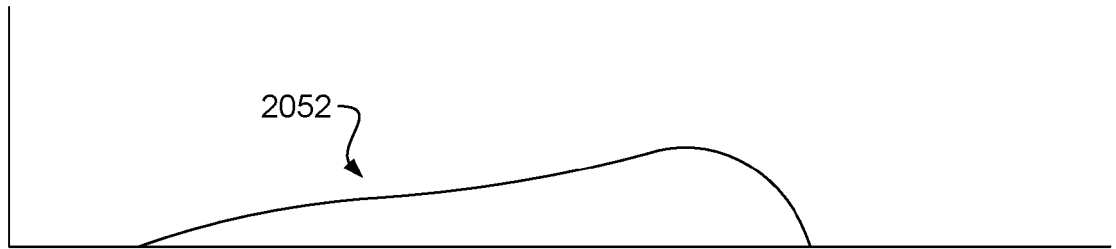
FIG. 20C depicts an example of two-dimensional battery cell profile depicting an uneven pressure in accordance with the disclosure.

FIG. 20C depicts an example of an expanded portion of the battery cell that is extending into an opening formed in the rigid casing of the battery assembly. In this example, the profile of the expanded portion exhibits an uneven curve and has an asymmetric profile 2052. Such a profile may be interpreted by the touch logic circuitry to have a pressure that is exerting the battery cell from an event other than an outgassing event. For example, such a profile may be interpreted to be caused by the battery cell shifting with respect to the rigid casing of the battery assembly. In such an example, a movement of the flexible pouch of the battery cell may be resisted by the edge of the opening in the rigid casing. In some cases, the touch logic circuitry may determine that such an event is non-hazardous may be determine to not execute a remedial action.

Figure 20D:
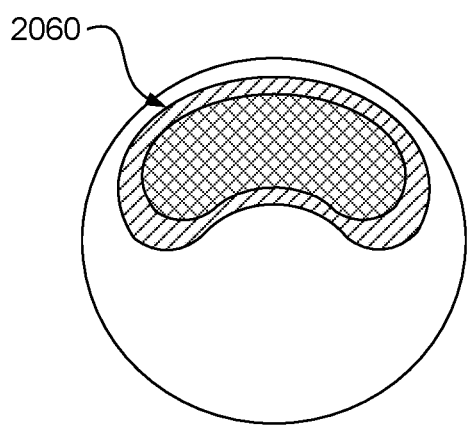
FIG. 20D depicts an example of three-dimensional battery cell profile depicting an uneven pressure in accordance with the disclosure.

FIG. 20D depicts an example of an expanded portion of the battery cell that is extending into an opening formed in the rigid casing of the battery assembly as represented from a three-dimensional view. In this example, the shaded regions may represent elevation of the battery cell. As can be seen in the illustrated example, in this embodiment the elevations 2060 are not uniform. Thus, the touch logic circuitry may determine that this protrusion into the opening is caused by an event other than outgassing.

Figure 20E:
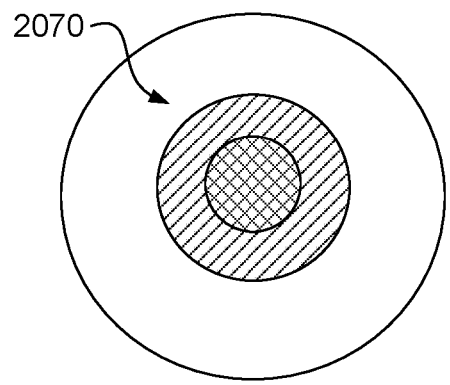
FIG. 20E depicts an example of three-dimensional battery cell profile depicting a uniform pressure in accordance with the disclosure.

FIG. 20E depicts an example of an expanded portion of the battery cell that is extending into an opening formed in the rigid casing of the battery assembly as represented from a three-dimensional view. In this example, the shaded regions may represent elevation of the battery cell. As can be seen in the illustrated example, in this embodiment the elevations 2070 are centered and symmetric. In this case, the touch logic circuitry may determine that this protrusion into the opening is caused by an outgassing event.

While the examples above have been described with reference to two different types of curves deemed to correspond with two different types events, any number of appropriate curve types may be analyzed and stored in the memory associated with the touch logic circuitry. Thus, various different types of events associated with the battery cells may be classified, and appropriate action may be triggered by the classification assigned to each of the profiles. Further, while the examples above have been described as being able to distinguish between different events affecting the profile of the battery based on symmetric and asymmetric characteristics, other characteristics may be analyzed. For example, the elevation of the profile, the shape of the profile, the pointedness of the profile, the roundedness of the curve, a slope of the profile, a wave pattern of the profile, a size of the affected curve, another characteristic of the curve, or combinations thereof may be analyzed to determine a condition of the battery cell.

Figure 21:
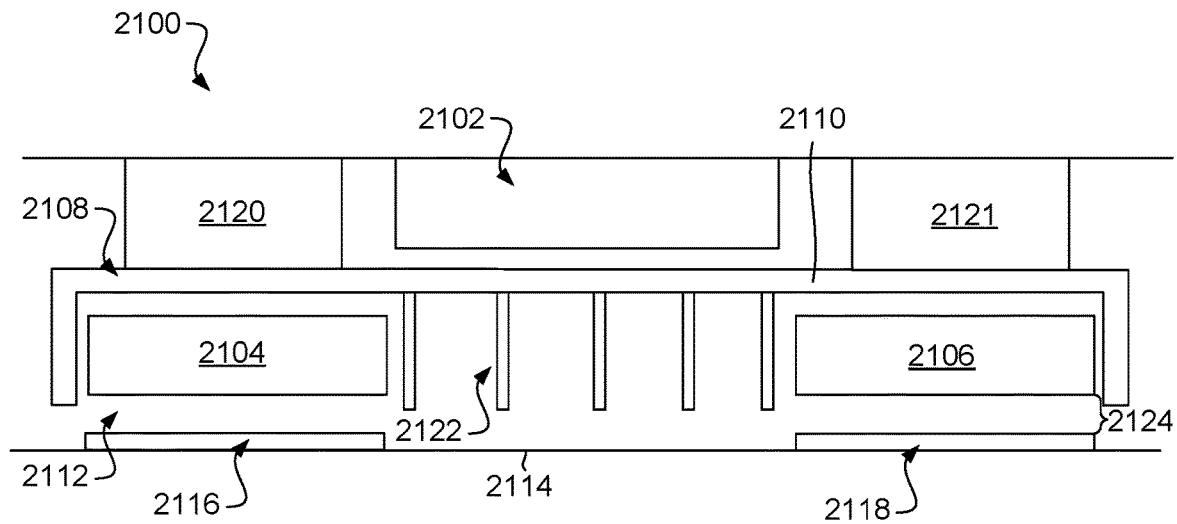
FIG. 21 depicts an example of swell detection circuitry located within an open underside of a battery assembly's casing in accordance with the disclosure.

FIG. 21 depicts an example of a portable electronic device 2100 that includes a touch pad 2102, a first battery cell 2104, and a second battery cell 2106. The first and second battery cells 2104, 2106 are partially encompassed with a rigid casing 2108. In this example, the rigid casing 2108 has a rigid barrier 2110 between the touch pad 2102 and the first and second battery cells 2104, 2106. The rigid casing 2108 also includes an open underside 2112 that is open to a floor 2114 of the portable electronic device 2100. A first substrate 2116 of the swell detection circuitry may be secured directly or indirectly to the floor 2114 subjacent to the first battery cell 2104, and a second substrate 2118 of the swell detection circuitry may be secured directly or indirectly to the floor 2114 subjacent to the second battery cell 2106. The first substrate 2116 may be positioned to detect changes in the shape and size of the first battery cell 2104, and second substrate 2118 may be positioned to detect changes in the shape and size of the second battery cell 2106. Each of the first substrate 2104 and the second substrate 2106 may be connected to the touch logic circuitry of the touch pad 2102.

In this example, spacers 2120, 2121 may be positioned between the top surface of the portable electronic device 2100 and the rigid casing 2108. Also, the rigid casing 2108 may include ribs 2122 located between first and second battery cells 2104, 2106 to provide extra rigidity to the rigid casing 2108.

Figure 22:
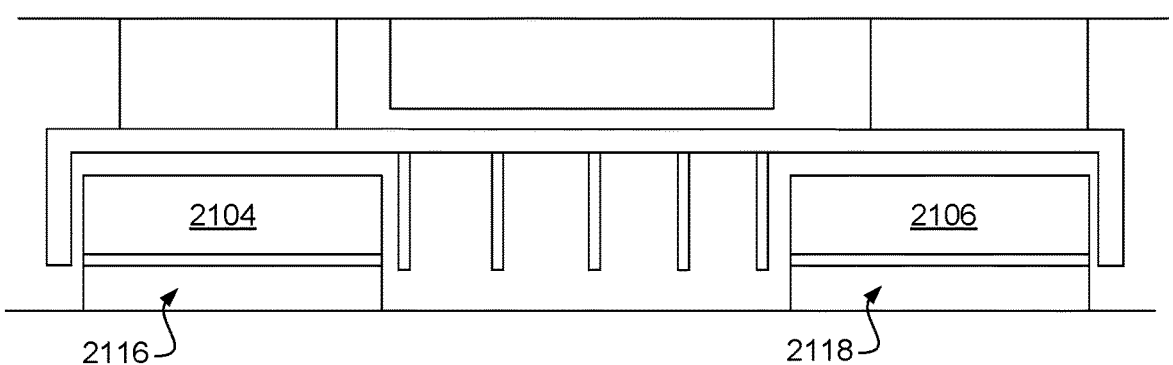
FIG. 22 depicts an example of swell detection circuitry in contact with a battery cell and located within an open underside of a battery assembly's casing in accordance with the disclosure.

In the illustrated example, a gap 2124 may exist between the substrates 2116, 2118 and their respective battery cells 2104, 2106. In the example of FIG. 22, the substrates 2116, 2118 are brought up into close proximity or into contact with their respective battery cells 2104, 2106. In some cases, the battery cells 2116, 2118 may be resting on their respective substrates 2104, 2106.

In the example of FIG. 22, the substrates 2116, 2118 may also be configured to detect a pressure exerted on the substrates 2116, 2118. In some examples, a sheath may be located between the substrates 2116, 2118 and their respective battery cells 2104, 2106. In such an example, the sheath may include at least one opening to sense the profile of the battery cell that protrudes into the opening. Sensing the profile of the protruding sections may help distinguish between situations where the battery cell is expanding due to outgassing or other reasons. For example, in some cases, a flexible pouch around of the battery cell may hang downward due gravity, but might have a different profile than a battery cell that is outgassing. The substrate with the multiple sets of electrodes may distinguish between a profile that results from outgassing and profiles caused by gravity or for other reasons.

Figure 23:
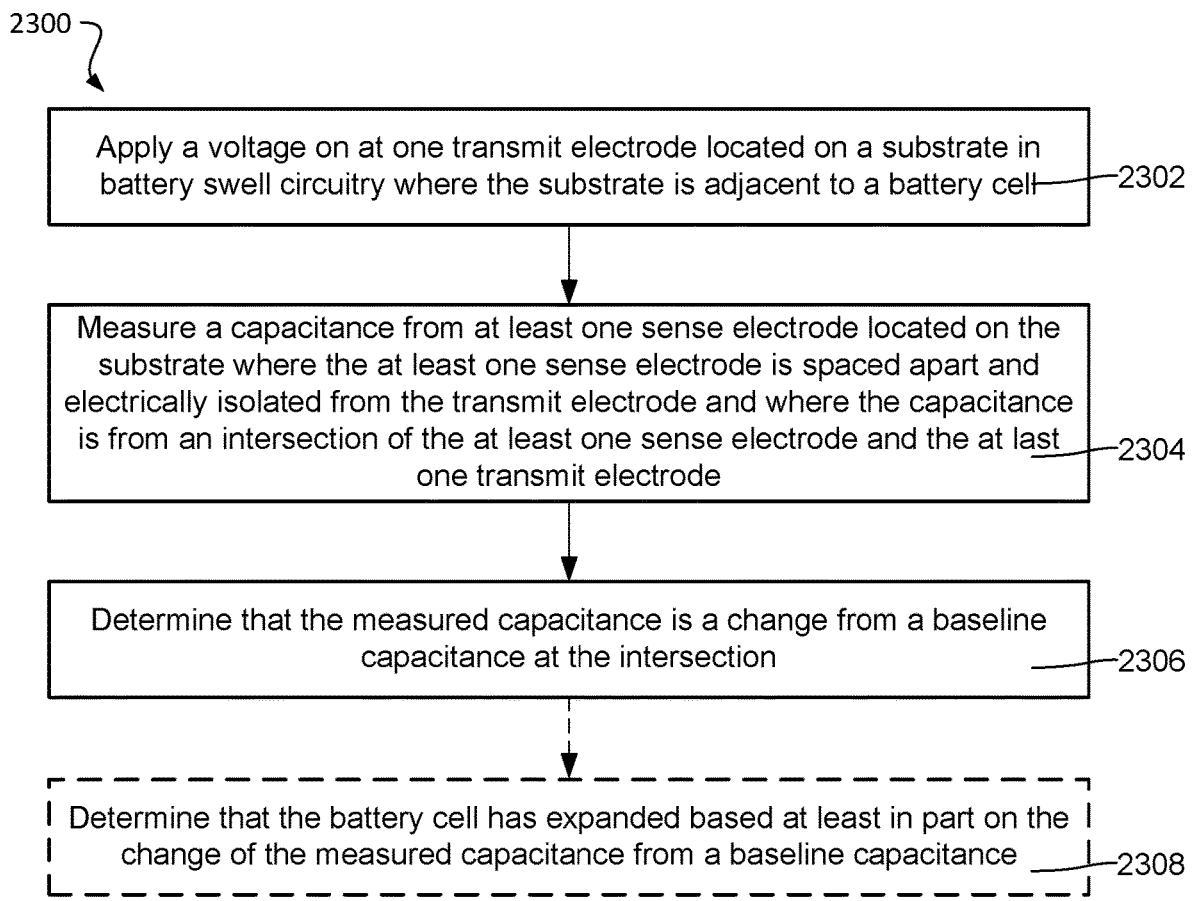
FIG. 23 depicts an example of a method of detecting a battery swell in accordance with the disclosure.

FIG. 23 depicts an example of a method 2300 for detecting battery swelling. This method 2300 may be performed based on the description of the devices, modules, and principles described in relation to FIGS. 1-22. In this example, the method 2300 includes applying 2302 a voltage on at one transmit electrode located on a substrate in the swell detection circuitry where the substrate is adjacent to a battery cell, measuring 2304 a capacitance from at least one sense electrode located on the substrate, where the at least one sense electrode is spaced apart and electrically isolated from the transmit electrode and where the capacitance is from an intersection of the at least one sense electrode and the at last one transmit electrode, and determining 2306 that the measured capacitance is a change from a baseline capacitance at the intersection. Optionally, in some examples, the method 2300 may include determining 2308 that the battery cell has expanded based at least in part on the change of the measured capacitance from the baseline capacitance.

Figure 24:
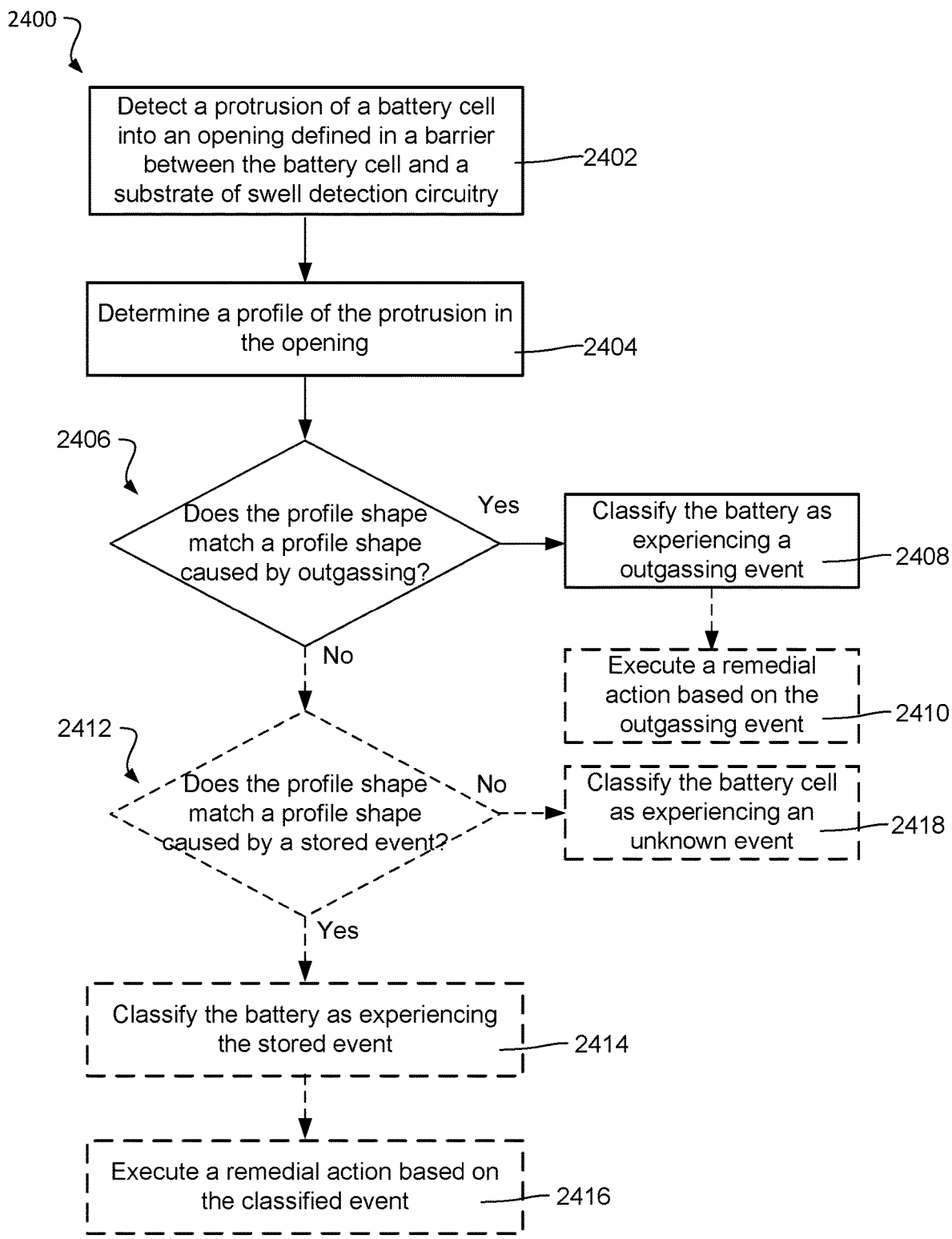
FIG. 24 depicts an example of a method of detecting a battery swell in accordance with the disclosure.

FIG. 24 depicts an example of a method 2400 for detecting battery swelling. This method 2400 may be performed based on the description of the devices, modules, and principles described in relation to FIGS. 1-23. In this example, the method 2400 includes detecting 2402 a protrusion of a battery cell into an opening defined in a barrier between the battery cell and a substrate of swell detection circuitry, determining 2404 a profile of the protrusion in the opening, and determining 2406 whether the profile shape matches a profile shape caused by outgassing. If the profile shape does match a profile caused by outgassing, the method 2400 may further include classifying 2408 the battery as experiencing a outgassing event. Optionally, the method 2400 may include executing 2410 a remedial action based on the outgassing event. If the profile shape does not match the outgassing profile shape, then the method 2400 may optionally determine 2412 whether the profile shape matches a profile shape caused by another stored event. If the profile shape does match the profile of another stored event, then the method 2400 may optionally classify 2414 the battery cell as experiencing the stored event, and optionally execute 2416 a remedial action based on the classified event. If the profile shape does not match the shape of other stored events, then the method may optionally include classifying 2418 the battery cell as experiencing an unknown event.

In some cases, the different events that the battery cell may experience are stored in a memory in the touch input component, in the swell detection circuitry, in the system board, in the cloud, in a remote device, in a networked device, in another location, or combinations thereof. In some cases, the profile shapes that correspond with these events may be stored. In the situation that the swell detection circuitry detects that an expanded portion of the battery cell is protruding into the opening in the rigid casing around the battery cells or the openings of another rigid barrier between the substrates of the swell detection circuitry and the battery cell, the measured capacitances may be analyzed to determine the shape of the protruding section of the battery cell.

If the profile shape matches the shapes of one of the stored events, then the battery cell may be associated with having experienced that event. Depending on the type of event, the touch logic circuitry may cause a remedial action to be triggered. The remedial actions may include sending a warning, shutting off the portable electronic device, backing up data on the electronic portable device, other remedial actions, or combinations thereof.

Figure 25:
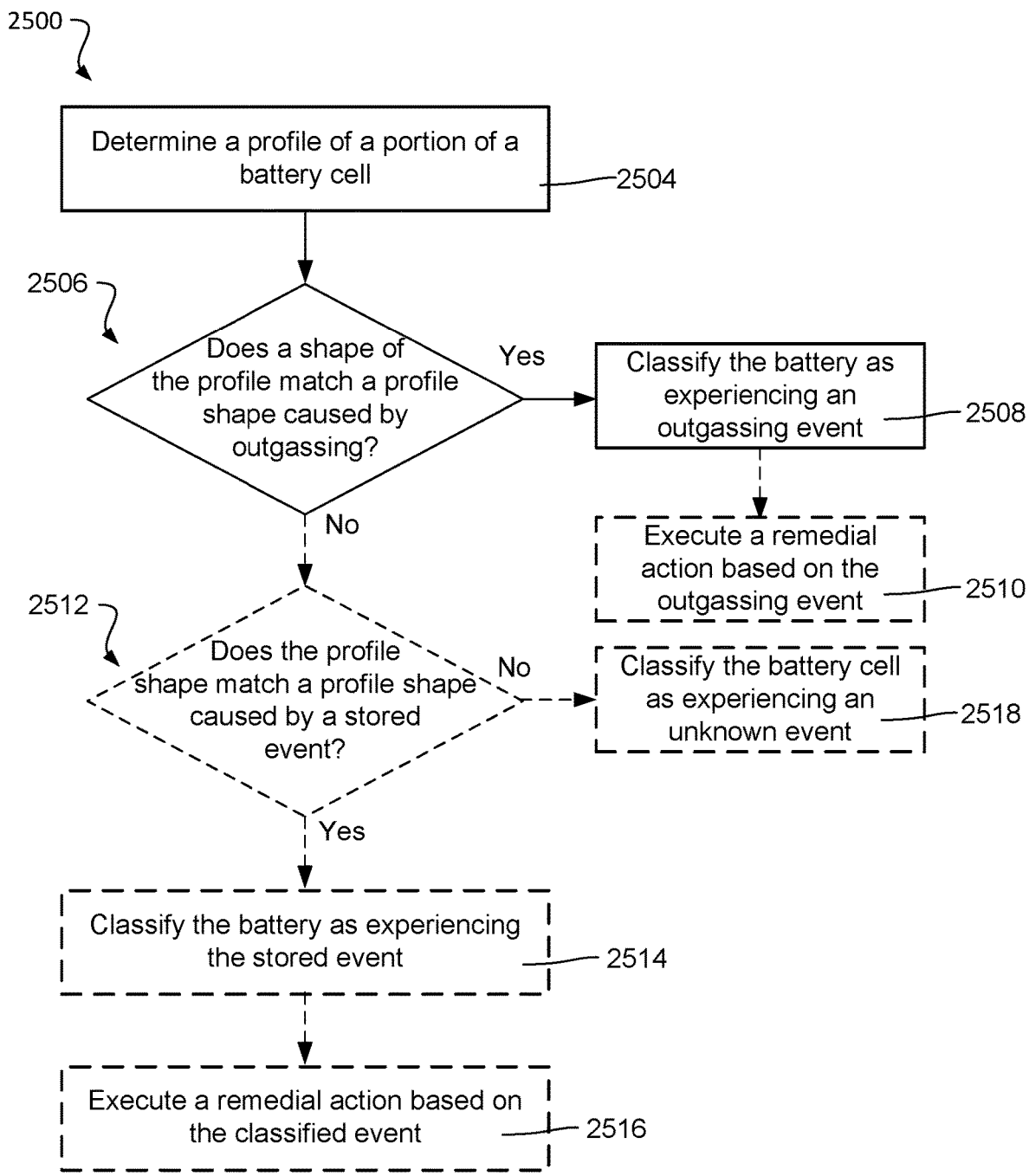
FIG. 25 depicts an example of a method of detecting a battery swell in accordance with the disclosure.

FIG. 25 depicts an example of a method 2500 for detecting battery swelling. This method 2500 may be performed based on the description of the devices, modules, and principles described in relation to FIGS. 1-24. In this example, the method 2500 includes determining 2504 a profile of a portion of the battery cell, and determining 2506 whether a shape of the profile matches a profile shape caused by outgassing. If the profile shape does match a profile caused by outgassing, the method 2500 may further include classifying 2508 the battery as experiencing an outgassing event. Optionally, the method 2500 may include executing 2510 a remedial action based on the outgassing event. If the profile shape does not match the outgassing profile shape, then the method 2500 may optionally determine 2512 whether the profile shape matches a profile shape caused by another stored event. If the profile shape does match the profile of another stored event, then the method 2500 may optionally classify 2514 the battery cell as experiencing the stored event, and optionally execute 2516 a remedial action based on the classified event. If the profile shape does not match the shape of other stored events, then the method may optionally include classifying 2518 the battery cell as experiencing an unknown event.

In some examples, the swell detection circuitry does not include openings in a barrier between battery cell and the substrate. In some cases, the shape of the battery cell's profile is the shape of the entire side of the battery cell, a portion of a side of the battery cell, portions of multiple sides of the battery cell, a corner of the battery cell, the entire shape of the battery shell, a portion of a shape of the battery cell, or combinations thereof.

Figure 26:
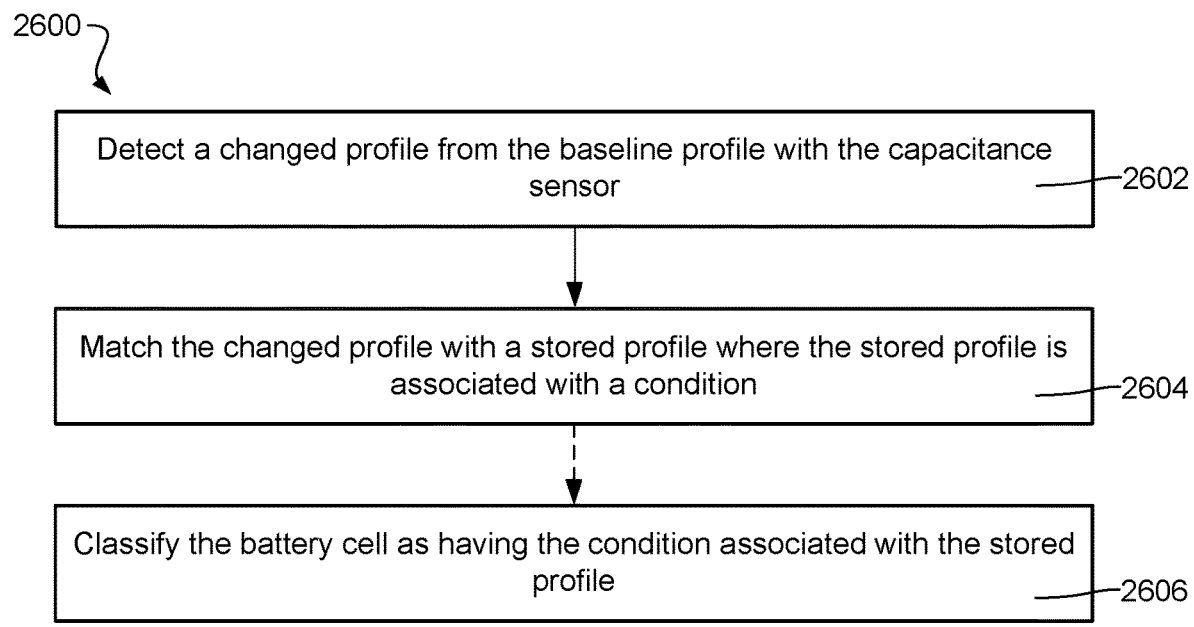
FIG. 26 depicts an example of a method of detecting a change in a battery cell in accordance with the disclosure.

FIG. 26 depicts an example of a method 2600 for detecting a change in a battery cell. This method 2600 may be performed based on the description of the devices, modules, and principles described in relation to FIGS. 1-25. In this example, the method 2600 includes detecting 2602 a change in a profile of a battery cell with the capacitance sensor, matching 2604 the changed profile with a stored profile where the stored profile is associated with a condition, and classifying 2606 the battery cell as having the condition associated with the stored profile.

The portable electronic device with the touch pad may be a laptop, a desk top, an external pad for providing input to a computing device or to the cloud computing device, a computing device, a networked device, an electronic tablet, a mobile device, a personal digital assistant, a control panel, a gaming device, a flat panel, a display, a television, another type of device, or combination thereof.

It should be noted that the methods, systems and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

The invention claimed is:

1. A system of detecting a change in a battery cell, comprising:
an embedded controller:
a touch pad in communication with the embedded controller;
a battery assembly, the battery assembly including:
at least one battery cell;
a swell detection circuitry adjacent to the battery cell;
the swell detection circuitry including:
a substrate with a first set of electrodes in communication with the embedded controller;
memory in communication with the embedded controller and storing programmed instruction that, when executed, cause the processor to:
determine a baseline profile of a battery cell with a capacitance sensor;
detect a changed profile from the baseline profile with the capacitance sensor;
match the changed profile with a stored profile where the stored profile is associated with a condition; and
classify the battery cell as having the condition associated with the stored profile;
the touch pad including:
a second set of electrodes of the touch pad are electrically isolated and spaced apart on the substrate from the first set of electrodes of the battery swell detection circuitry;
wherein the embedded controller is configured to process the outputs from the battery swell detection circuitry and process the touch inputs from the touch pad.

2. The system of claim 1, wherein the battery assembly is incorporated into a portable electronic device and the stored profiles are stored in the portable electronic device.

3. The system of claim 1, wherein the condition is battery swelling due to outgassing.

4. The system of claim 1, wherein the programmed instructions are further configured to cause the controller, when executed, to send a notification about the condition when the condition is classified as a potentially dangerous condition.

5. The system of claim 1, wherein the condition is a movement shift between the battery cell and a rigid casing at least partially encompassing the battery cell.

6. The system of claim 1, wherein the stored profile is characterized by a symmetric shape is associated with a condition of battery cell swelling due to outgas sing.

7. The system of claim 1, wherein the baseline profile includes a side of the battery cell.

8. The system of claim 1, wherein the baseline profile includes a portion of the battery cell accessible through an opening formed in a rigid casing encompassing at least a portion of the battery cell.

9. The system of claim 1, wherein a region subjacent to the track pad is void of swell detection circuitry.

10. The system of claim 1, wherein the battery includes multiple battery cells stacked against each other.

11. The system of claim 1, wherein the programmed instructions that, when executed, cause the controller to identify which of the multiple battery cells is swelling and which are not swelling.

12. The system of claim 1, wherein the swell detection circuitry is attached to an internal surface of a rigid casing.

13. The system of claim 1, wherein the programmed instructions that, when executed, cause the controller to link swelling with an event of a portable electronic device.

14. The system of claim 1, wherein the swell detection circuitry is connected to a data port that is electrically connected to touch circuitry of the touch pad.

* * * * *